US012627471B2

(12) United States Patent
Fang et al.

(10) Patent No.: US 12,627,471 B2
(45) Date of Patent: May 12, 2026

(54) SECURE GENERATIVE-ARTIFICIAL INTELLIGENCE PLATFORM INTEGRATION ON A CLOUD SERVICE

(71) Applicant: Oracle International Corporation, Redwood Shores, CA (US)

(72) Inventors: Ming Fang, Bellevue, WA (US); Simo Lin, Bellevue, WA (US); Beiwen Guo, Auburn, WA (US); Wei Gao, Bellevue, WA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 18/676,232

(22) Filed: May 28, 2024

(65) Prior Publication Data

US 2025/0097013 A1 Mar. 20, 2025

Related U.S. Application Data

(60) Provisional application No. 63/583,167, filed on Sep. 15, 2023, provisional application No. 63/583,169, filed on Sep. 15, 2023.

(51) Int. Cl.
*H04L 9/08* (2006.01)
*G06F 9/50* (2006.01)
(Continued)

(52) U.S. Cl.
CPC .......... *H04L 9/0822* (2013.01); *G06F 9/5011* (2013.01); *G06F 9/5044* (2013.01);
(Continued)

(58) Field of Classification Search
CPC ..... H04L 9/0822; H04L 9/0825; H04L 41/16; H04L 47/741; H04L 47/76; G06N 5/04; G06F 2209/503
See application file for complete search history.

(56) References Cited

U.S. PATENT DOCUMENTS 10,956,584 B1 3/2021 Heaton et al.
2018/0341848 A1* 11/2018 Breuer .................... G06N 3/02
(Continued)

FOREIGN PATENT DOCUMENTS

CN 116011552 A 4/2023

OTHER PUBLICATIONS

Ying-fang Fu, "Quantum Data Key Negotiation System And Quantum Data Key Negotiation Method", Apr. 24, 2018, CN 107959566 A (Fit English Translation), pp. 1-77 (Year: 2018).*
(Continued)

*Primary Examiner* — Jonathan A Bui
(74) *Attorney, Agent, or Firm* — Mughal Gaudry & Franklin PC

(57) ABSTRACT

The present disclosure relates to secure deployment of model weights from a generative artificial intelligence (GenAI) platform to a cloud service. The method includes accessing the model metadata and a set of weights of a GenAI model associated with a GenAI platform. These model weights may be encrypted using a first encryption key that may be provided in the model metadata. These encrypted model weights may be decrypted based on the model metadata by utilizing the first encryption key from the model metadata. Each key may be associated with the specific type of GenAI model. Before storing the model weights from the GenAI platform cloud tenancy to a cloud storage in GenAI home region, the model weights may be encrypted again by utilizing a second encryption key. This encryption by the cloud may enable independent control over the sensitive information during transit and storing.

20 Claims, 13 Drawing Sheets

(51) Int. Cl.

| | |
|---|---|
| ***G06N 5/04*** | (2023.01) |
| ***H04L 41/16*** | (2022.01) |
| ***H04L 47/74*** | (2022.01) |
| ***H04L 47/76*** | (2022.01) |

(52) U.S. Cl.

CPC ............. *G06N 5/04* (2013.01); *H04L 9/0825* (2013.01); *H04L 41/16* (2013.01); *H04L 47/741* (2013.01); *H04L 47/76* (2013.01); *G06F 2209/503* (2013.01)

(56) References Cited

U.S. PATENT DOCUMENTS

| | | | | |
|---|---|---|---|---|
| 2019/0197655 | A1 | 6/2019 | Sun et al. | |
| 2019/0312772 | A1 | 10/2019 | Zhao et al. | |
| 2021/0097894 | A1* | 4/2021 | Iyer | G06N 20/00 |
| 2021/0150037 | A1* | 5/2021 | Radhakrishnan | G06N 20/00 |
| 2022/0019663 | A1* | 1/2022 | Stapleton | G06F 21/554 |
| 2022/0067574 | A1 | 3/2022 | Barnes | |
| 2022/0114249 | A1 | 4/2022 | Grancharov et al. | |
| 2023/0105309 | A1* | 4/2023 | Davis | H04L 9/0894 713/176 |
| 2023/0188319 | A1* | 6/2023 | Froelicher | G06N 3/098 713/189 |
| 2024/0039692 | A1* | 2/2024 | Xu | H04L 9/008 |

OTHER PUBLICATIONS

U.S. Appl. No. 18/741,656, filed Jun. 12, 2024.

U.S. Appl. No. 18/676,239, filed May 28, 2024.

U.S. Appl. No. 18/676,248, filed May 28, 2024.

International Search Report and Written Opinion for PCT Patent Application No. PCT/US2024/046809, dated Dec. 23, 2024.

International Search Report and Written Opinion for PCT Application No. PCT/US2024/046810, dated Dec. 4, 2024.

Michael Wang at al., "GPU-accelerated 1-20 machine learning inference as a service for computing in neutrino experiments," Arxiv.org, Cornell University Library, 201, Sep. 9, 2020, Olin library Cornell university Ithaca, NY.

* cited by examiner

Access model metadata and a set of weights of a generative machine-learning model encrypted using a first encryption key (1305)

Utilize the first encryption key from the model metadata to decrypt the set of weights of the generative machine-learning model (1310)

Generate a second encryption key within a cloud home region (1315)

Encrypt, based on the model metadata, the set of weights with the second encryption key (1320)

Store the encrypted set of weights to a cloud storage in the cloud home region (1325)

Deploy the encrypted set of weights of the generative machine-learning model in a namespace within the cloud home region (1330)

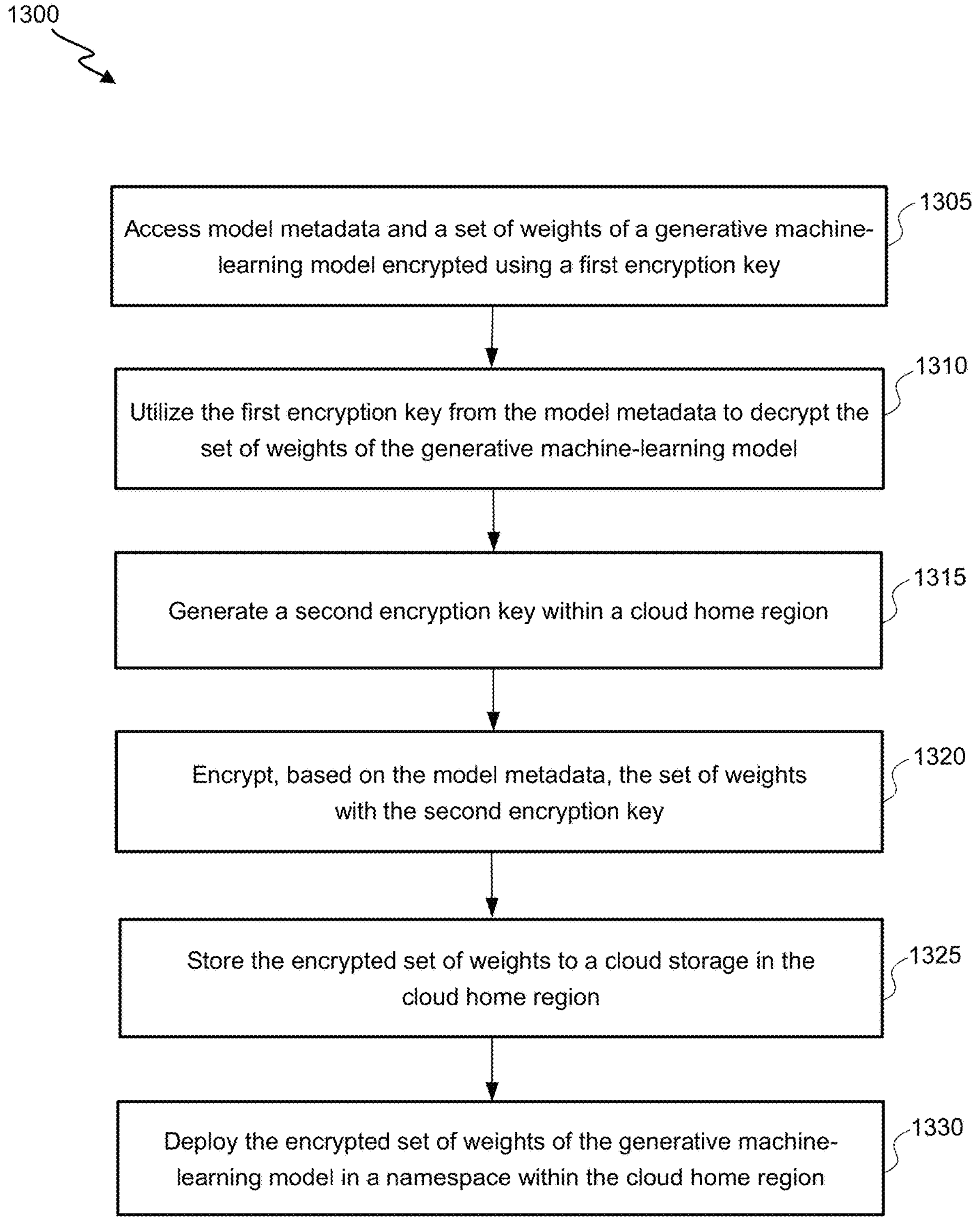

*FIG. 13*

SECURE GENERATIVE-ARTIFICIAL INTELLIGENCE PLATFORM INTEGRATION ON A CLOUD SERVICE

CROSS-REFERENCE TO RELATED APPLICATIONS

This application claims the priority to and the benefit of U.S. Provisional Application No. 63/583,167, filed on Sep. 15, 2023, and U.S. Provisional Application 63/583,169, filed on Sep. 15, 2023. Each of these applications is hereby incorporated by reference in its entirety for all purposes.

BACKGROUND

While generative artificial intelligence (GenAI) is still in its early stages of adoption, several dedicated platforms have emerged that specialize in training and generating the foundation models. Machine-learning models can be trained on big datasets and leverage deep-learning technologies. For example, a machine-learning model may use a transformer model and/or large language model (LLM). GenAI may be a significant technology as it enables the automated production of personalized content at a scale. GenAI can write code to support the development lifecycle, including a variety of unit, validation, and integration tests. Data scientists can benefit from GenAI by generating data without revealing sensitive or personal information. Synthetic data generation techniques are immensely used in the financial and healthcare sectors. For example, a human capital management (HCM) application can use GenAI to draft job description, summarize job applications and outline online learning courses.

However, the rapid advancements in this domain have brought the challenges of governance, security, and privacy to the mainstream focus. The security of weights of GenAI model within a cloud platform may be important because such weights control performance of the models; therefore, creating secure defense system against unauthorized access and potential data breaches may be required. Consequently, such technologies may be of concerns that provide a secure and seamless integration access to GenAI platforms and that provide a robust and protected environment for leveraging GenAI capabilities and delivering enterprise-grade secure AI systems.

SUMMARY

Certain aspects and the features of the present disclosure relate to a secure integration of generative machine-learning or artificial intelligence (GenAI) platforms within a cloud service. The system enables hosting a variety of machine-learning models including large language models (LLMs) and generative models through a consolidated and consistent set of application programming interfaces (APIs), including the models sourced from external GenAI platforms and/or open-source models. When a GenAI model, such as LLM is trained, weights of the LLM are learned. Hence, the learned set of weights represents a machine-learning model, and the competitive advantage of models depends on how accurately the weights of model are learnt for different use cases. Therefore, it is important that the weights are securely stored and/or retrieved from a storage. When a client requests a GenAI task (e.g., inference task, such as generating a text or an image), it may initiate a collaborative process between the GenAI platform and the cloud infrastructure, with the goal of efficiently fulfilling the task while maintaining data privacy and security. In this context, the GenAI platform may share a model metadata with the cloud service. The model metadata may include, but not limited to, model name, creation and/or last training time, model architecture, configurations, training parameters, encryption keys, model versions and other related attributes. It may also provide information on which part of the model is to be encrypted, how to encrypt and/or decrypt it and what level of encryption may be required.

The present disclosure relates to deployment of model weights securely from a GenAI platform to a cloud service by accessing the model metadata and a set of weights of a generative machine-learning, hereinafter as GenAI, model associated with a GenAI platform. These model weights may be encrypted using a first encryption key, also referred to as data encryption key (DEK), that may be provided in the model metadata. The model metadata and the encrypted set of weights may be stored in a cloud storage (e.g., GenAI platform object/model store) within the cloud that is dedicated to the GenAI platform, also termed as GenAI platform cloud tenancy. These encrypted model weights may be decrypted based on the model metadata by utilizing the first encryption key from the model metadata. Before storing the model weights from the GenAI platform cloud tenancy to a cloud storage in GenAI home region, the model weights may be encrypted again by utilizing a second encryption key. The GenAI home region may refer to a primary data center or a geographic region where a dedicated tenancy for GenAI development is established and managed within a cloud service. The second encryption key, also termed as key encryption key (KEK), for GenAI model weights may be managed independently by the GenAI cloud vault or key management service (KMS) within the GenAI home region.

In some aspects, each first encryption key and second encryption key are associated with the specific type (or family) of the GenAI models. Encrypting the model weights independently by the second encryption key during transition from the GenAI platform to a GenAI home region may provide an additional layer of security. While decryption with the first encryption key may be necessary for utilizing model weights within cloud environment, encrypting again may enable that the data remain protected during transit and storage within the cloud infrastructure. Additionally, if, for example, the security is compromised at GenAI platform region, this additional layer of security may provide immunity for the GenAI home region.

When deploying model weights, access to the cloud storage may be enabled where the encrypted weights are securely stored. Additionally, the deployment environment may be organized into namespaces, which provide isolation and management of resources in the computing environment of the cloud. Within a particular namespace, a deployment process may be devised to manage the deployment of the model weights and associated components. Once the deployment plan is established, the encrypted model weights of the GenAI platform can be deployed in the namespace. This may involve organizing and packaging the weights into a format suitable for deployment, along with any necessary metadata or configurations. Each deployment is associated with one service account.

For the deployment of the model weights associated with a GenAI application, the cloud may initialize a serving container and an associated GPU(s) by starting up the container runtime and loading necessary components. The serving container, operating within the particular namespace, may retrieve or download the encrypted model weights and/or model metadata from a cloud model store and decrypt the weights before loading these into a local temporary storage e.g., graphic processing unit (GPU) memory. In some instances, the model weights may be decrypted using the second encryption key (KEK). With model weights loaded into the temporary storage, the incoming inference requests or queries related to the associated GenAI application may be handled for generating inference results.

In some instances, at runtime, when an inference request (query) is received from a user interacting with GenAI application, the cloud infrastructure may route the requests to an appropriate (initialized) serving container with loaded model weights. The input data from the inference request may be preprocessed by a processing unit (e.g., a central processing unit (CPU)) and transferred to the temporary storage. With both the model weights and the input data residing in the temporary storage, the inference task may be performed by applying the learned weights of the model to the input (e.g., through a series of mathematical operations). On completion of the inference task, an inference response or an inference output may be generated that may be sent back to the user or application initiating the request. At GPU teardown that may occur upon completion of inference requests, termination of a virtual machine in a cloud, exit of a containerized (GenAI) application, or shutdown or reboot of the system, all data including the model weights and allocated resources for processing the inference requests may be removed. By deleting the model weights, the cloud may not have access to the decrypted model weights of the GenAI platform. Thus, providing a robust and secure deployment of proprietary data and intellectual property and avoiding potential data breaches or leakages.

In some aspects, when the rotation is triggered after a predefined interval of time, a new second encryption key may be generated. After decryption of DEK, using the second encryption key (KEK), DEK is again encrypted by using the new second encryption key. Both keys can be stored in a cloud vault that is also backed up by a cloud identity module and only certain entities may be allowed to access the keys.

The mechanism of encrypting model weights is subjected to constraints including: (1) set of weights of each GenAI model are associated with a unique first and second encryption keys; (2) set of weights of each GenAI is deployed in a different namespace in the cluster of GenAI nodes, where each deployment is associated with a different service account; (3) each second encryption key is only accessible by one service account; (4) first encryption key associated with the weights of the GenAI model of a GenAI platform is used only for an initial access of GenAI model weights and subsequent decryption in the GenAI cloud memory.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-implemented method is provided that includes: accessing a model metadata and a set of weights of a generative machine-learning model encrypted using a first encryption key that is generated by a generative machine-learning platform, wherein the generative machine-learning model is associated with the generative machine-learning platform hosted on a cloud, and wherein the model metadata includes the first encryption key; utilizing the first encryption key from the model metadata to decrypt, based on the model metadata, the set of weights of the generative machine-learning model; generating a second encryption key within a cloud home region; encrypting, based on the model metadata, the set of weights by the second encryption key; and storing the encrypted set of weights to a cloud storage in the cloud home region.

The model metadata may be stored in a generative machine-learning platform cloud tenancy. The first encryption key may be associated with a single set of model weights of the generative machine-learning model. The first and second encryption keys may be associated with a specific type of the generative machine-learning models. A method disclosed herein may further include: deploying the encrypted set of weights of the generative machine-learning model in a namespace within the cloud home region, wherein each deployment is associated with a single service account. A method disclosed herein may further include: accessing the encrypted set of weights from the cloud storage; decrypting the encrypted set of weights using the second encryption key; loading the set of weights from the cloud storage to a temporary storage; receiving an inference query associated with the generative machine-learning model into the temporary storage; performing an inference task by applying the set of weights to the inference query; generating an inference output in response to performing the inference task; and deleting the set of weights from the temporary storage. The second encryption key may be accessed by a single service account. A method disclosed herein may further include: rotating encryption keys after a predefined interval of time by generating a new second encryption key; decrypting the first encryption key with the second encryption key; encrypting the first encryption key using the new second encryption key; and storing the first encryption key and the new second encryption key in a cloud identity module.

In some embodiments, a computer-program product tangibly embodied in a non-transitory machine-readable storage medium, including instructions configured to cause one or more data processors to perform part or all of one or more methods or processes disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 13 illustrates an example process flow for deploying model weights securely from the GenAI platform to the cloud infrastructure.

DETAILED DESCRIPTION

Figure 1:
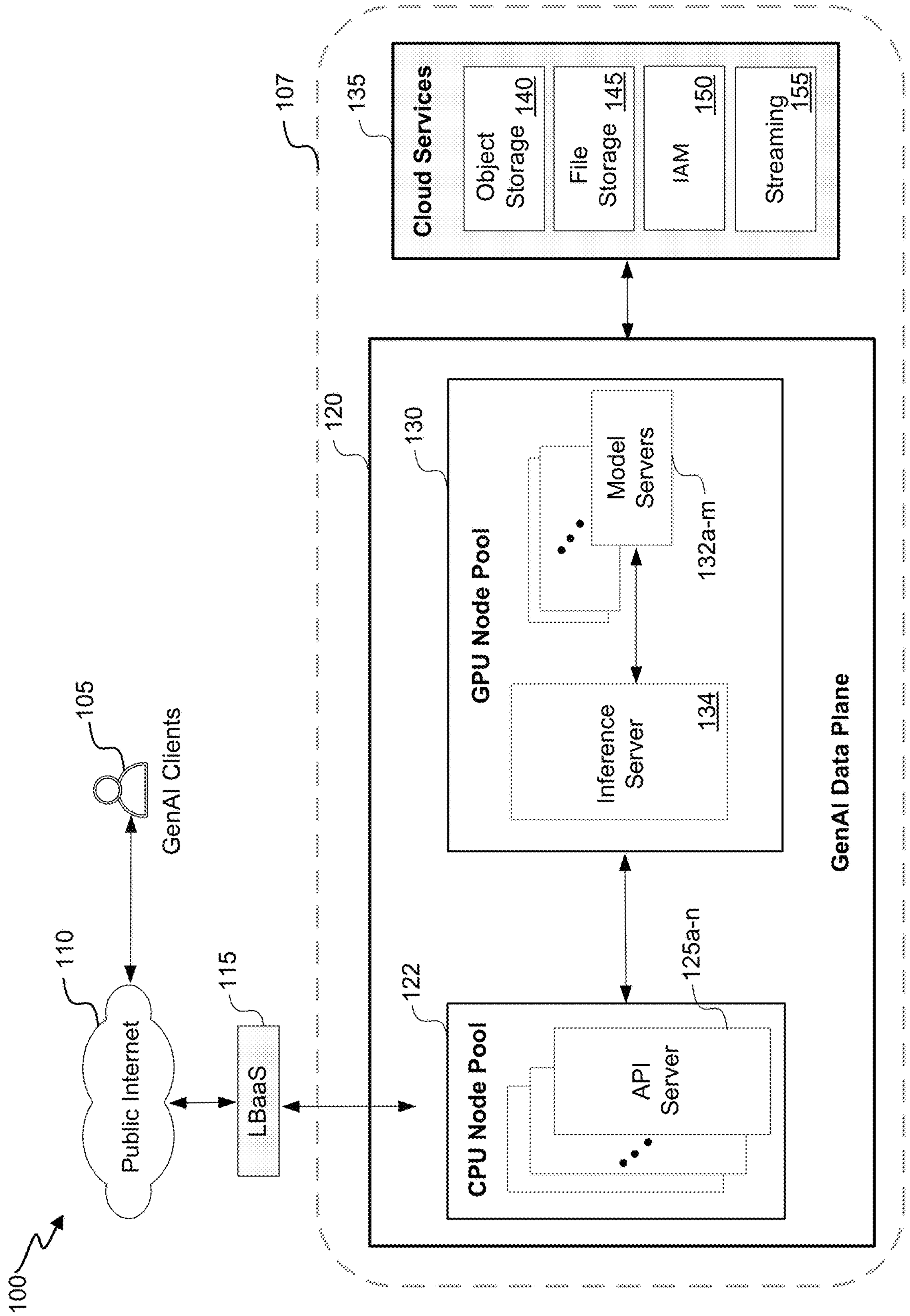
FIG. 1 shows an exemplary overview of a secure system architecture providing interactions between the generative artificial intelligence (GenAI) clients and a cloud infrastructure hosting a GenAI platform.

A generative artificial intelligence (GenAI) platform refers to an AI platform that specializes in generating human-like text or content using advanced natural language processing (NLP) techniques and models. These platforms may offer a range of services and capabilities including, but not limited to large language models (LLMs), application programming interface (API) access, customization, and other design facilities. GenAI platforms may provide APIs that developers and users can utilize to interact with the text generation capabilities offered by the platform. Through these APIs, users can send prompts or input texts to the platform and receive generated responses. GenAI platforms may be designed to be integrated into various applications, services, and workflows.

Generative artificial intelligence (GenAI) may include a set of techniques and algorithms that leverage enormous amount of data, including, but not limited to large language models (LLMs), to generate new content (e.g., text, images, videos, 3D renderings, audio, code). Unlike traditional machine-learning techniques that focus on analyzing the underlying dataset, the GenAI techniques may involve generation of new data samples. For GenAI models such as LLMs, potential security leakages might occur for a GenAI service, a developer using LLMs to power an application, or a user. These security leakages may include intellectual property (IP) leakage such as unauthorized access to model weights, user data leakage (e.g., prompts including sensitive information or responses) and toxic content generation. The security of GenAI model weights may be important, as the learned weights may be an intellectual property that an organization has invested in. Additionally, the accuracy of generated responses of machine-learning models may depend on how accurately the model parameters (weights and biases) are learned. Therefore, securing the weights with a robust defense against unauthorized access, tampering, and potential breaches may be a strategic decision.

In some embodiments, the disclosed system may provide cloud services for hosting GenAI models obtained through the clients, such as proprietary GenAI models of a GenAI platform and/or open-source models through a consolidated and consistent set of application programming interfaces (APIs). Cloud infrastructure can be configured to support clients in maintaining their data on-premises, providing stringent control over access and compliance with industry regulations. The cloud services may also provide security services to avoid cross-tenancy model leakages such as accessing a client's custom-trained models trained/fine-tuned on private data. Additionally, cloud services may offer customizable configurations, granting the individual clients a control over the privacy and security of their data. This tailored approach may allow for the implementation of appropriate privacy protections for each client's data. In addition to providing data security and privacy, the integration of a GenAI platform with a cloud infrastructure can also improve the scalability, flexibility, cost effectiveness, a global reach to its users and clients and resources offered by the cloud environments. Furthermore, the integration of the GenAI platform with the cloud may enable GenAI users to access scalable resources dynamically allocated by the cloud, improving performance and responsiveness to fluctuating demands. This integration may enhance the overall efficiency and security of GenAI applications while providing users with the flexibility to adapt to evolving computational needs.

In another aspect, the present disclosure provides a secure system and method to encrypt the model weights of GenAI models hosted by the cloud infrastructure. These GenAI models may include the models sourced from external GenAI platforms and/or open-source models. When a client requests a GenAI task, it may initiate a collaborative process between the GenAI platform and the cloud infrastructure, with the goal of efficiently fulfilling the task while maintaining data privacy and security. In this context, the GenAI platform may share the model metadata with the cloud. Model metadata may include, but not limited to, model architecture, model size, configuration, training parameters, encryption keys, model versions and other related attributes. The model weights may (or may not) be included in model metadata. By sharing this metadata with the cloud, the GenAI platform may enable seamless integration and interaction with cloud services, facilitating efficient resource allocation, model deployment, and inference execution. This collaboration may provide that the cloud infrastructure has access to essential insights about the models being utilized, enabling it to optimize resource utilization, scalability, and performance while adhering to data privacy and security requirements.

The security of GenAI models may be provided when the weights of a trained GenAI model are encrypted at rest and then stored within a cloud storage to thwart attempts by adversaries to access them (e.g., by compromising the cloud infrastructure). The disclosed system may comprise of a GenAI development tenancy home region, a GenAI platform cloud tenancy, and a GenAI region. A GenAI development tenancy home region, hereinafter as GenAI home region, in the context of a cloud refers to a primary data center or a geographic region where a dedicated tenancy for GenAI development is established and managed within a cloud service. A GenAI platform cloud tenancy is a specific portion of a cloud infrastructure that is designated for hosting and integrating a GenAI platform. It may provide isolated resources and environment that are needed for GenAI operations within the cloud. The GenAI region refers to the data centers where a dedicated tenancy for GenAI development is established and managed within a cloud for remote regions.

The GenAI home region may comprise of a graphic processing unit (GPU) node pool, GenAI model stores and a GenAI cloud vault. The GPU node pool may host multiple GenAI platform serving pods or open-sourced models that may require GPU resources for executing machine-learning workloads of GenAI models. A GenAI client or user, such as a developer or data scientist, may interact with the GenAI models and GenAI cloud tenancy through API server to manage secure access to machine-learning models. The GenAI platform cloud tenancy may store model weights and related assets securely in a GenAI platform model store. These model weights may be encrypted with GenAI platform keys, also referred to as DEK (data encryption key) that can be managed by GenAI vault with the GenAI platform cloud tenancy. Each key may be associated with a specific family (type) of the GenAI models. By associating keys with specific model families, a GenAI platform and/or cloud can enforce fine-grained access control policies. This may allow only authorized users or applications to access the models thereby reducing the risk of unauthorized access to sensitive or proprietary models and avoiding cross-tenancy leakages. Each family of models may operate within its own isolated environment. If, for example, one model family is compromised, the impact is limited to that specific family, and other model families remain unaffected.

When the GenAI platform serving pods may require model weights for inference or other predictive tasks, retrieval may occur from the GenAI cloud model store. This retrieval may be facilitated by a service gateway (e.g., a download agent within the GPU node pool) in GenAI home region, such that only a specific pod has the read access to GenAI platform model storage and vault. The download agent may securely retrieve encrypted model weights from the GenAI platform cloud tenancy. Once retrieved, the download agent may again encrypt the model weights using GenAI cloud security keys (GAIS), also referred to as KEK (key encryption key), after decryption with GenAI platform key (DEK). This encryption by the cloud may enable independent control over the sensitive information during transit and storing, for example, if the keys are compromised at the GenAI platform tenancy, this additional layer of security may provide immunity within the GenAI home region thereby avoiding IP leakages.

The encrypted model weights can be pushed to both the GenAI cloud model store and the GenAI cloud object store for replication. The encrypted model weights may be used to replicate to other tenancies through the shepherd module. The shepherd module within the GenAI service is responsible for managing the replication of model weights across different regions. It may also be responsible for storing open-source models within the cloud storage for further processing by GPU node pool. When deploying model weights for inference tasks, access to the cloud storage holding the securely encrypted weights can be enabled. This may involve setting up access credentials or authentication mechanisms to securely retrieve the encrypted weights as required. Furthermore, the deployment environment may be structured into namespaces, offering logical isolation and resource management within the cloud computing environment. Within these designated namespaces, a deployment process can be devised to oversee the deployment of the model weights and related components. The process may define the steps for accessing, loading, and utilizing the weights to execute inference tasks. Once the deployment process is finalized, the encrypted model weights may be deployed within a specified namespace. The deployment process may involve organizing and formatting the weights appropriately for deployment, along with any essential metadata or configurations. In some instances, each deployment is linked to a specific service account from among the available service accounts.

For the deployment of the model weights associated with a GenAI application, the cloud may initialize the container and the associated GPU(s) by starting up the container runtime and loading necessary components including booting up GPU hardware, loading GPU driver, allocating GPU memory and/or an inference server software. The serving container, operating within the specified namespace, may retrieve or download the encrypted model weights and/or model metadata from a cloud model store and decrypt the weights before loading these into GPU memory (local temporary storage). In some instances, the model weights may be decrypted using the second encryption key (KEK). With the model weights loaded into the GPU memory, the serving container is set to handle all the incoming inference requests related to the associated GenAI application. The inference server within the serving container may process these incoming inference requests, generating inference results.

In some instances, at runtime, when an inference request (query) is received from a user interacting with the GenAI application, the cloud infrastructure may route the request to an appropriate initialized serving container with loaded model weights. The routing could be based on load balancing algorithms, container orchestration policies or other routing mechanisms. The input data from the inference request may be preprocessed (e.g., normalization, resizing, tokenization, or feature engineering) by e.g., a processing unit such as CPU to prepare it for feeding it into the GenAI model. Once the data is preprocessed, it may be transferred from the processing unit to the GPU memory. With both the model weights and the input data residing in GPU memory, the inference task may be performed by applying the learned weights of the model to the input (e.g., through a series of mathematical operations e.g., matrix multiplication, convolution etc.). On completion of the inference task, a response or an output may be generated that may be sent back to the user or application initiating the request.

At GPU teardown that may occur upon completion of inference requests, termination of a virtual machine in a cloud, exit of a containerized (GenAI) application, or shutdown or reboot of the system, all data including the model weights and allocated resources for processing the inference requests may be removed. By deleting these model weights, the cloud may not have access to the decrypted model weights of the GenAI platform. This may provide a robust and secure deployment of proprietary data and intellectual property and avoid potential data breaches or leakages. Further, the GenAI platform keys can be managed in the cloud to enable granular access controls and policies to maintain the secrecy of the weights. The disclosed comprehensive security architecture may protect model weights throughout their lifecycle, sensitive machine-learning models from unauthorized access and provide confidentiality and integrity within a cloud based GenAI platform.

It should be understood that a container or a serving container is a lightweight, standalone, executable unit of software that packages up code and all its dependencies (e.g., environment variables, libraries) to be run on a base operating system. The containers (or serving containers) can also be linked with GPUs to leverage GPU resources for tasks such as machine-learning, data processing and scientific computing. A namespace provides processes a way to partition various system resources such as process identifiers (IDs), network interfaces, mount points etc. enabling multiple processes to run without interfering with each other. The containers may leverage namespaces to achieve isolation. Each container typically runs a single process (or tightly coupled group of processes) within its own namespace.

In some embodiments, the cloud services may offer content moderation for avoiding toxic content generation. Content moderation may be applied in multiple stages of the GenAI training and inference lifecycle. To this end, the sensitive or toxic information may be removed from training data before the model is trained or fine-tuned. In some instances, models can be trained to not give responses about sensitive or toxic information, such as a user's prompt, "how to commit crimes or engage in unlawful activities." In other instances, filtering can be applied, or response generation can be halted if the results include undesirable content.

Custom-trained models may be associated with a specific client where it may be required that the data used to fine-tune a model for one client is not used to train or improve any other model. To avoid cross-tenant model leakage, the disclosed system may enable all models, including custom-trained models, to be only accessible by the GenAI service roles. The disclosed system may associate each custom-trained model with a cloud tenancy identifier (CID) and may only allow requests authenticated to the correct CID to access a given custom-trained model.

In some instances, to avoid user data leakages the system may provide an end-to-end secure communication among various components of the cloud infrastructure. The traffic to and from the various components of the cloud may be encrypted on the wire, including traffic between virtual machines (VMs) or serving pods within the cloud network. This may avoid user data contamination from different requests. Additionally, the system may enable that no portion of the request or response is stored outside of transient, in-memory caches. These caches may not be exposed to administration or system developers in any way and may be lost when the service goes down. The GenAI service may not log any portion of user prompts or responses. The only telemetry logged may be metadata about requests, such as latency, response code, approximate input and output length.

Open-source models may go through the traditional shepherd deployment process. Artifacts, for example, model weights, output or result of the development process that may include compiled code, documentation, or other files generated may be stored in an artifactory. These artifacts may also be stored in cloud artifact storage including GenAI cloud object storage and model storage or file storage service (FSS). For an inference or other related GenAI task, these open-source models may be deployed to serving containers from these storages.

FIG. 1 shows an exemplary overview of a secure system architecture 100 providing interactions between the generative artificial intelligence (GenAI) clients 105 and a cloud infrastructure 107 that may be hosting a GenAI platform. The system comprises of GenAI clients 105, connected to a load balancer as a service (LBaaS) 115 via a public internet 110, and a cloud 107, such as Amazon AWS, Oracle cloud infrastructure (OCI), Microsoft Azure, or Google cloud platform (GCP). The cloud infrastructure 107 may comprise GenAI data plane 120 integrating model servers 132*a-m* for one or more GenAI platform model or open-source models and various cloud services 135. When a GenAI platform (e.g., Cohere or OpenAI) is integrated into a cloud infrastructure 107, it becomes a part of the overall cloud system. The GenAI data plane 120 may further include a CPU (central processing unit) node pool 122 and a GPU (graphic processing unit) node pool 130. GenAI may necessitate a specialized infrastructure (i.e., GPU node pool 130) comprising GPUs interconnected with a cluster network to achieve ultra-high performance. For example, OCI boasts an industry-leading remote direct memory access (RDMA) super cluster network capable of providing network latency as low as two microseconds. When customers set up infrastructure for the cloud GenAI service, the service may automatically establish a dedicated AI cluster, which includes dedicated GPUs and an RDMA cluster network for connecting the GPUs. The GPUs allocated for a customer's generative AI tasks are isolated from other GPUs thereby hosting the fine-tuning and inference workloads of clients.

The CPU node pool 122 may comprise a set of nodes for resource management tasks within GenAI data plane 120 of the cloud 107. This may include monitoring resource usage, scheduling tasks or allocating resources on demand to enable efficient performance and resources utilization across the system. In GenAI data plane 120, the CPU node pool 122 can handle tasks related to preprocessing and managing the data before feeding into the generative models. This may include tasks, such as data cleaning, normalization, and feature extraction. The GenAI data plane 120 may further comprise API servers 125, inference server(s) 134 and model servers 132*a-m*. These components work together in GenAI data plane 120 to process requests of clients and generate outputs using computational resources (e.g., GPU nodes or cloud services 135) of the cloud 107. The CPU node pool 122 can host various API servers 125*a-n* that may be responsible for handling incoming requests from users, other systems and/or GenAI clients 105. These API servers 125*a-n* may also manage tasks, such as user authentication, request routing, and data validation before passing the request to the appropriate components. Inference is the process of using a trained AI model to make predictions or generate outputs based on input data. In the context of GenAI, this may often involve generating new data samples, such as images, text or music based on patterns learned from the training data.

The inference server 134 may be responsible for executing trained GenAI models to perform inference tasks in real-time, while the model servers host and manage the trained models thereby providing efficient access and management capabilities. The model servers 132*a-m* may serve as a central repository where GenAI models are stored and accessed by inference server 134.

The model weights associated with a GenAI application may be encrypted for security and thus deployed by the cloud 107 onto the GPU node pool 130. The cloud 107 may initialize the necessary components such as containers, associated GPU(s) and/or an inference server software. The encrypted model weights (and/or model metadata) from a cloud model store may be retrieved and decrypted before loading these into GPU memory (local temporary storage). Inference servers 134 typically run on GPU nodes to leverage the efficient computational capabilities of GPUs and for high-speed inference. With the model weights loaded into the GPU memory, the inference server is prepared to handle all the incoming inference requests related to the associated GenAI application. The inference server may process these incoming inference requests, generating inference results.

From FIG. 1, one or more requests may be received from a GenAI client 105 using a terminal, such as a web application, a mobile application, or an API. The requests of GenAI client(s) 105 can be directed to a load balancer as a service (LBaaS) 115 that receives all traffic at the entry point. LBaaS 115 may be included internally or externally to a cloud service 107 and attempt to equally divide the incoming service requests to API servers 125*a-n* within the GenAI data plane 120. In an aspect, the cloud services may offer one or more LBaaS 115 to dynamically track demand from each client and to determine how to allocate resources based on the demand. After processing a user query received via a client 105 in one or more servers supporting a GenAI model of the client, the system can generate a response. This response can be relayed back through the same components, that start with the LBaaS 115, which enables the response to be sent to the user. With an increase in a user's demand, a cloud system 107 may automatically scale the resources that are allocated to GenAI platform users to handle the load of large number of queries.

The clients 105 are authenticated by the access control policies within the API servers 125*a-n* enabling the authenticated clients with granted permissions and rights, depending on their roles, to use the services of a GenAI platform. The API servers 125*a-n*, based on the nature of a query, may forward incoming requests to inference server 134 or various model servers 132*a-m*. The model server 132 may be serving machine-learning models from one or more GenAI platforms and/or open-sources. These model servers 132*a-m* are specialized in executing machine-learning models and natural language processing tasks. The model servers 132*a-m* may enable access over the network to other applications to send data for inference and to receive predictions or results from the models. The queries can be in the form of text, voice, or other data types, depending on the capabilities of a platform that may be using NLP models to understand and process the user queries in a user-friendly manner. The GenAI data plane 120 may analyze the text, extract the intent of its users, and identify entities that are mentioned in the queries. The GenAI data plane 120 may then generate a response to the query by using its AI model(s), such as natural language processing model. The integration with a cloud infrastructure 107 can enable scalability in terms of computing power and memory storage thereby providing a reliable and consistent performance while executing GenAI open-sourced and non-open sources such as GenAI platform.

The GenAI platform may interact with the users' data and their queries must adhere to cloud compliance and governance policies that include data security and privacy regulations and standards. The CPU node pool 122 may further process requests to various API servers 125*a-n* that are responsible for handling user requests or queries within the cloud 107 and then forwarding them to the appropriate services for further processing.

Seamless and dependable usage by GenAI clients 105, may be supported by various cloud services 135, dependencies, libraries, and runtime environments. For example, GenAI data plane 120 may also leverage cloud services 135, including, but not limited to, an object storage module 140, a file storage module 145, an identity and access management (IAM) 150 module and streaming module 155. GenAI clients 105 may use the GenAI models from the GenAI platform that is integrated in the cloud 107 or open-source models using a network, such as the internet 110. IAM services 150 provided by the cloud 107 may enable secure management of user roles, identities, and permissions within the cloud infrastructure thereby avoiding IP leakage and cross-tenancy leakage. IAM policies can be configured to control access to resources, APIs and services based on specific users or groups. This security may enable that only authorized GenAI clients 105, users and services can interact with the GenAI platforms and its components. The authentication process can be completed by IAM 150 services providing centralized user management leveraging techniques, such as username and password validation, multi-factor authentication (MFA), and single sign-on (SSO).

ML models can be stored securely using file storage 145 and object storage 140 modules provided by the cloud infrastructure 107. These cloud services 135 may enable persistent and secure data availability. An object storage 140, such as Amazon S3 or google cloud can manage and store large volumes of heterogeneous data, structured data and/or unstructured data. The stored data can include files, documents, images, backups, etc. Object storage 140 can provide scalable, durable, and highly available storage for data used by GenAI data plane 120 for data archiving, backup and restore, storing large datasets, training datasets, generated outputs, and content distribution (e.g., for websites and applications). Streaming services 155, such as Amazon Kinesis can be used to ingest real-time data streams from various sources, such as sensors, social media feeds, or application logs. These streams of data can be processed by the GenAI data plane 120 to generate insights, perform analysis, or trigger automated actions in response to specific events. A file storage 145 services can be used to store configuration files for model deployment, model checkpoints, auxiliary data used during inference or training processes and other resources that may be required by GenAI platform. The file storage 145 may provide a fully managed network file storage (NFS) solution that may allow clients to create and manage file systems. It may be used when multiple computation instances need to share cloud resources and access the same set of files. This may include workloads, such as application data sharing, home directories for clients, and as a shared storage backend for applications running in a multi-tier architecture.

Figure 2:
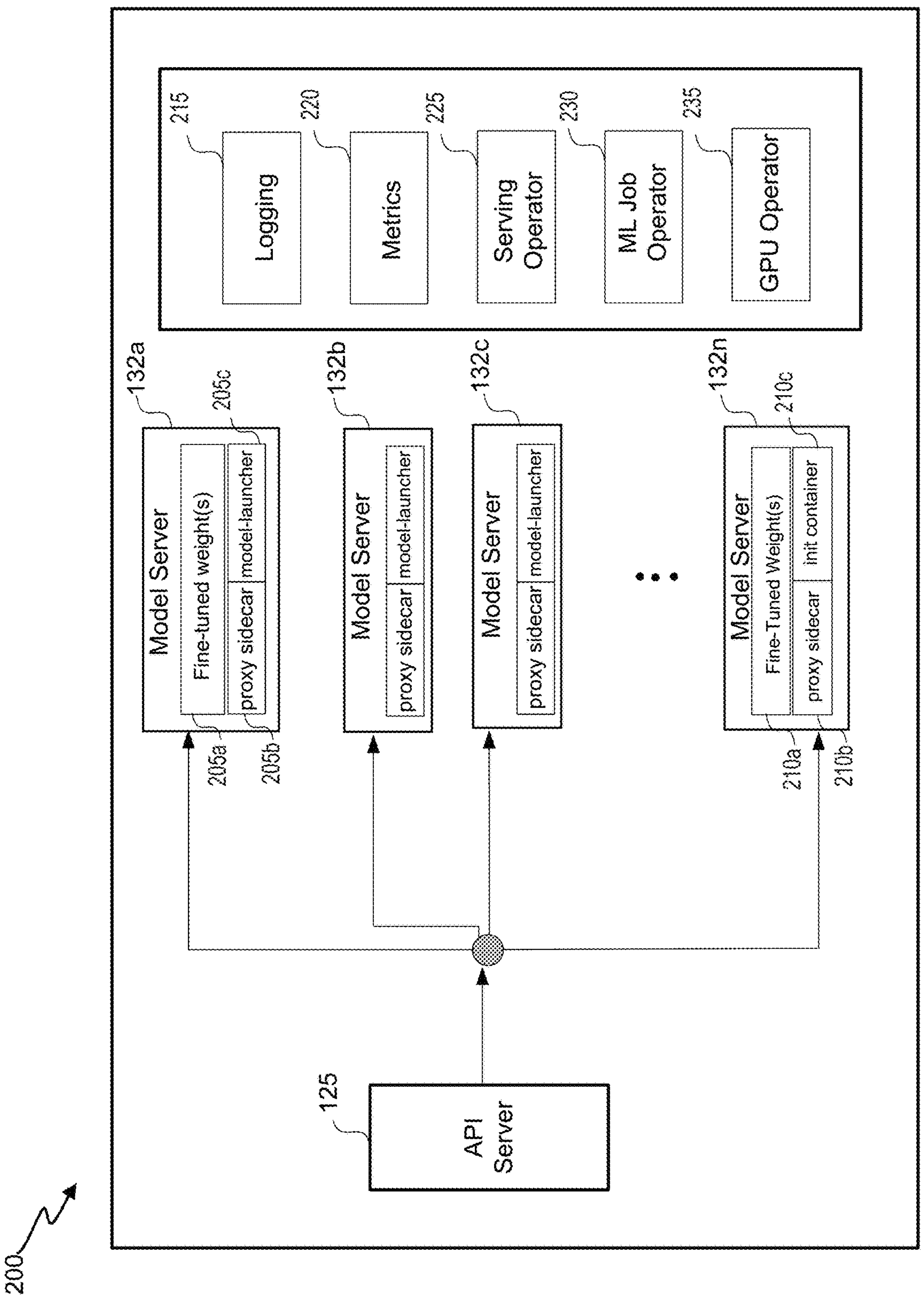
FIG. 2 illustrates an exemplary detailed structure of one or more components from a secure system architecture.

FIG. 2 illustrates an exemplary detailed structure of one or more components from a secure system architecture (e.g., such as an architecture depicted in FIG. 1). The cloud infrastructure 107 from FIG. 1 that may include an API server 125, a plurality of model servers 132*a-m* serving open-source and GenAI platform models, a logging module 215, a metrics module 220, a serving operator module 225, an ML job operator 230 and a GPU operator 235. It is worth mentioning that the model servers 132*a-n* shown in FIG. 2 are shown as an illustrative example and not limited to any specific number.

The model server 132*a* may include other components, such as fine-tuned weights 205*a*, proxy sidecar 205*b* and model-launcher 205*c* and similar components. The cloud infrastructure 107 may allow for customization and fine-tuning of the base models for specific tasks to make them more effective for real-world enterprise use cases or GenAI clients 105. This fine-tuning process may require expertise and collaboration. For example, a cloud, such as Oracle partnered with a GenAI platform such as Cohere to adapt and tailor their LLMs to enterprise applications. In this case, clients can use the Cohere models, their fine-tuning strategy, and other models, such as Meta's Llama 2. Fine-tuned weights 205*a* in a model server can be generated by retrieving learned weights of a base model corresponding to one or more first tasks or domains. These learned weights can be adjusted using a client specific training data set that may correspond to a different specific task or domain. This may enhance the performance of pre-trained machine-learning models by fine-tuning them with task-specific data thereby improving the accuracy for specific applications.

The proxy sidecar e.g., 205*b* and 210*b* is a container that may run alongside the main model-serving container within the same pod. The proxy sidecars are commonly used for load balancing of incoming requests across multiple instances of model-serving containers, traffic routing and implementing features like circuit breaking and retries. An init container 210*c* is an additional container in a pod that is responsible for initialization tasks that may be required for setting up environment or preparing data before the main container starts. For a model server, an init container 210*c* can be used for downloading pre-trained models or model artifacts from a storage location. The regular container can be selectively started when the init container 210*c* is running. The init container 210*c* in a pod is to run and complete before any other application containers in that pod start. The model-launcher e.g., 205*c* and 210*c* may load, initialize, and serve ML models within model-serving containers. It may load the pre-trained models, or the model artifacts downloaded by init container 210*c* into memory, initialize any required dependencies or libraries, and expose an endpoint or API for serving inference requests.

The model servers 132*a-n* may leverage other cloud services 135 for compliance with industry regulations to secure clients' data and interactions with the models from open-source and GenAI platform. These services may include a logging module 215, metrics services 220, serving operator 225, ML job operator 230, and GPU operator 235. The logging module 215 may capture and store logs that can be generated by various services and components in the cloud 107. It may perform tracking and monitoring activities, diagnosing issues, and enabling compliance with auditing and security requirements. The logs may include information related to model inference, resource utilization, and access control etc. The metrics services 220 may monitor the system performance, providing efficient resource utilization. It may collect, store, and provide insights into different performance metrics and statistics related to different machine-learning models and other cloud resources. It may allow users to monitor the behavior, health, and efficiency of the deployed models and infrastructure. Metrics 220 may include customer metrics (which tenancy calls what API at what time, etc.), application metrics (response code, latency, etc.), host metrics (memory usage, CPU usage, etc.), k8s metrics (pod count, pod health, scaling, etc.), GPU metrics (health, memory usage, etc.) and model serving metrics (model response code, model response latency, etc.).

The serving operator 225 is a cloud component or service that may facilitate the deployment and management of machine-learning (ML) models for performing real-time inference in a cloud 107. It may automate tasks related to model serving, including scaling the inference service based on demand, load balancing, and routing requests to the appropriate model version or instance. The other cloud services, such as ML job operator 230 may be responsible for managing the lifecycle of machine-learning jobs in the cloud 107. It may enable clients to create, schedule, and orchestrate ML workflows, including data preparation, model training, and model validation, testing and evaluation. It may also handle complex ML tasks, such as training new models and updating the existing ones. These operators interact with graphics processing units (GPU) operator 235 for executing computationally intensive tasks. GPU operators 235 may manage the allocation and utilization of GPUs in the cloud 107 for AI and ML workloads that use high computational power. They can be used to reduce the training time of deep learning models and inference. The GPU operator 235 may also enable provision and configuration of GPU resources to the GenAI clients 105 for the ML tasks by optimizing performance and resource utilization.

The two main components of GenAI data plane may be an API server 125 and inference server 134. The core responsibilities of the API server 125 may include forwarding users' requests (e.g., text generation and embedding requests) to the inferencing component and returning responses to users. The API server 125 may also perform rate limiting for requests and authorization by leveraging cloud IAM module 150 on incoming requests. Performs. The rate limiting may include regular request per minute (RPM)-based rate limiting, as well as custom token-based rate limiting. The API server 125 may integrate the limits service to override default limits for a specific tenancy and moderate content in incoming request and outgoing response for avoiding toxic content generation. Content moderation may be applied in multiple stages of the GenAI training and inference lifecycle. For example, the sensitive or toxic information may be removed from training data before the model is trained or fine-tuned. In some instances, models can be trained to not give responses about sensitive or toxic information, such as a user's prompt, "how to commit crimes or engage in unlawful activities." In other instances, filtering can be applied, or response generation can be halted if the results include undesirable content. In this way, profane text may be rejected by an API server 125 resulting in an exception.

Additionally, the API server 125 may query model metastore to retrieve model metadata and send metering and billing information to bling service after a successful completion of a user request. The API server 125 may also emit metrics and logs where the metrics may include customer metrics, application metrics, host metrics, k8s metrics, GPU metrics and model serving metrics.

Figure 3:
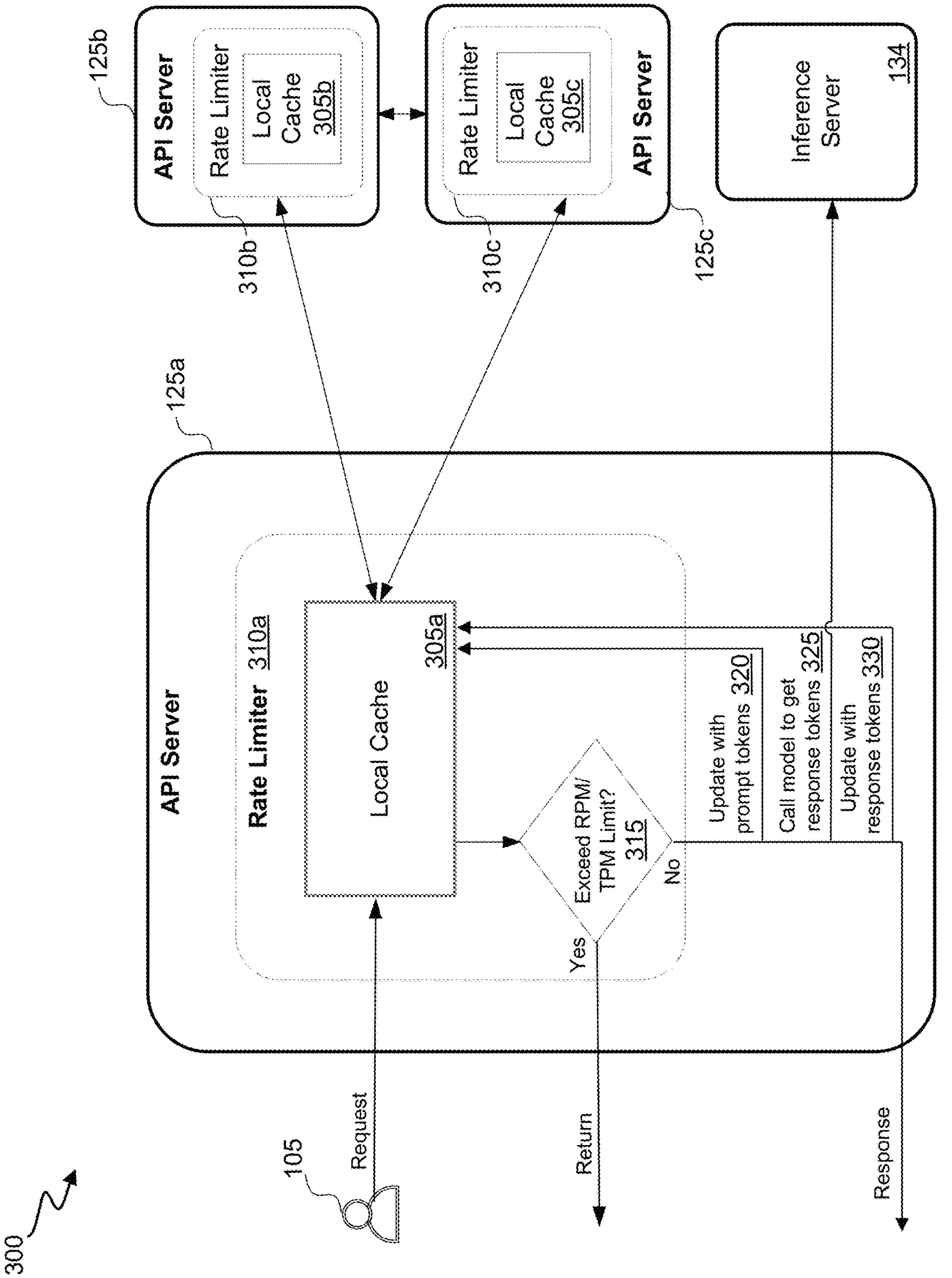
FIG. 3 illustrates an example flowchart of an incoming request to an API server.

FIG. 3 illustrates an example flowchart 300 of an incoming request to an API server. An API server 125*a* may receive a request from a GenAI client 105 or a user. The cloud services may provide an enhanced user experience by providing users to send multiple prompts and/or input text inline in the form of an array along with a set of configurations. These inputs may be further processed using the appropriate GenAI model and generate texts based on configurations provided. The cloud services may further allow users and clients to receive generated texts in a single response or as a stream, provide a list of strings inline and receive corresponding embeddings synchronously, retrieve a list of available models and get the details of a specific model.

For example, a request may include a text suggestion or completion request for answering a question. LLM-driven text generation generally involves producing a single token at a time to complete the text given in the input. This could be thought of as generating the next word in a partiallycompleted sentence, e.g., "The capital of France is < . . . >". The assumption is that a reasonable LLM will be trained on enough factual data to generate output that is both grammatically and factually correct. In this example, the model may be expected to generate the token "Paris". For question answering or chat requests, the situation is identical. After receiving the request, "What is the capital of France?", the model may generate one single token at a time e.g., "The"—"capital"—"of"—"France"—"is"—"Paris". The rate limiter e.g., 310*a* may take a decision, at block 315, on whether this request exceeds a threshold, requests per minute (RPM), taking account of the number of input tokens (i.e., tokens per minute (TPM)). The number of tokens being used (input+output) may vary from request to request. For example, the number of tokens a request can consume is usually between 10s to 2048 for small and medium models, while larger and more powerful models allow up to 4096 tokens.

In some instances, the cloud services may provide a multi-platform fairness. The total RPM for each model may be fixed by the available GPUs in that region until new GPUs become available and provisioned. To maintain fairness in a multi-platform environment, the focus may be that how each tenancy is supported sharing the total RPM fairly (not necessarily equally) when there is a burst of traffic? To this end, the rate limiter 310 in each API server 125 may have a global request history in the past X seconds with a bit of lag depending on the frequency of synchronization. This data may be leveraged to dynamically adjust the limits for each tenancy or GenAI platform based on the number of concurrent users in real time. The calculation may factor in current number of model replicas and GPUs, number of tenancies in the past X seconds as well as limit overrides for some tenancies, and then reset the allowed RPM.

When a request is received at rate limiter 310*a*, two types of information may be available: the number of input tokens, and the max number of tokens to be output. However, total output tokens may be unknown until the model generates all of them. If the total count of tokens for a request or total requests do not exceed limits, a local cache e.g., 305*a* may be updated with the number of input tokens, at 320. If the request exceeds limits, API server 125*a* may return an error (e.g., error 429: too many requests back to the caller). After the limit check is validated, the API server 125*a* may call the inference server 134 or model server 132 and get the number of output tokens (i.e., for this specific example one output token, "Paris"), at 325. For streaming cases, the output tokens may accumulate as they are streamed. The local cache may be updated again, at 330, with the number of output tokens. If the number of response tokens exceeds the token permits at that time, the service may not bound that request to maintain good user experience, given the user has already waited for some time and all the work has been done. Finally, the API server 125 may return a response to the client 105 or user. Each API server e.g., 125*a*, 125*b* and 125*c* may have a dedicated thread for broadcasting and updating its cache per scheduled broadcast interval as can be seen in FIG. 3. It may be understood that only for the purpose of illustration three API servers are shown in FIG. 3, the number can vary.

Figure 4:
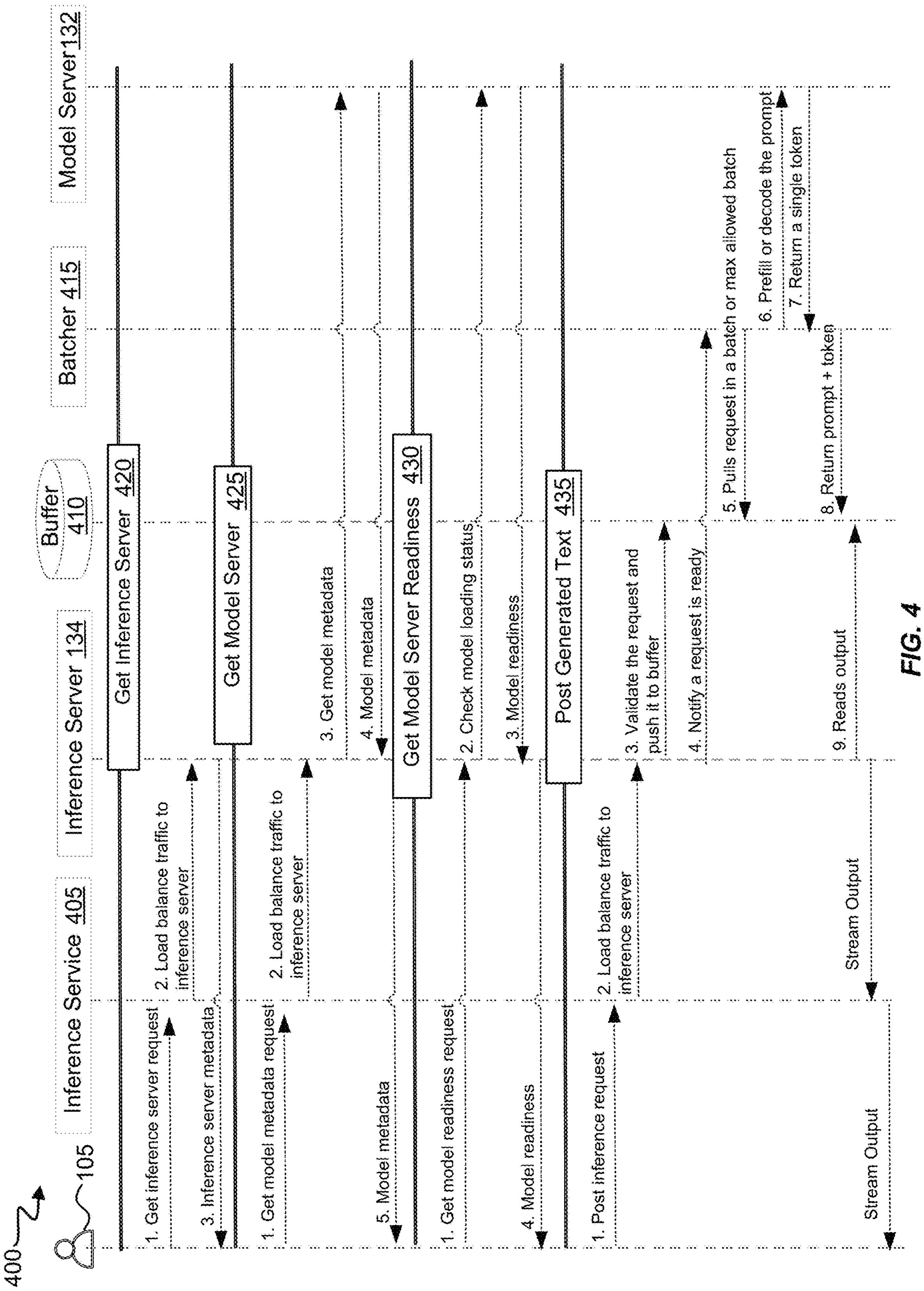
FIG. 4 illustrates an example sequence diagram depicting a flow of a client request through various components of the cloud infrastructure.

FIG. 4 illustrates an example sequence diagram 400 depicting a flow of a client request through various components of cloud integrating GenAI models from open-sources and GenAI platforms. The components may include inference service 405, inference server 134, a buffer 410, a batcher 415 and a model server 132. The inference service 405 may represent the interface or API endpoint through which client requests are received. A set of messages may be exchanged between various components of GenAI platform for different request e.g., get inference server 420, get model server 425, get model server readiness 430 and post generated text 435.

The second main component of GenAI data plane 120 may be the inference server 134 responsible for accepting requests from the API server 125 and translating them into requests to the model serving backend, while implementing caching and other logical operations to improve latency. In some instances, a nominal inference server 134 may be a lightweight Golang implementation that uses an inference service 405 e.g., gRPC (remote procedural call) to communicate with the model server(s) 132*a-m*. This may provide a lightweight binary wire protocol for efficient communication, as well as streaming support. Referring to FIG. 4, a sequence diagram of a request for getting inference server 420 is illustrated where a client 105 may initiate a request for inference server. The inference service 405 receives this request and may determine the appropriate inference server 134 to handle the request and forward the request to the selected inference server 134. The inference service 405 may also consider balancing the load traffic for a specific inference server 134. After processing the request, the inference server may send the server metadata to the GenAI client 105. Server metadata may include details, such as host health (e.g., CPU usage, memory usage or network bandwidth), model status (model used for inference, such as its version or last training timestamp), number of deployed instances or other inference server attributes.

For getting the model server 425, a client may initiate a request message to the inference service 405, specifically requesting model metadata. The inference service 405, based on the type of request and load traffic, may direct the request to an appropriate inference server 134. The inference server 134 may receive the request message for model metadata and send a request message to the model server 132 to retrieve the model metadata. The model server 132 may retrieve the metadata associated with the requested model, construct a response message including the metadata and send it back to the inference server 134. The inference server 134 may forward the metadata response back to the client 105. The model metadata may encompass details about a machine-learning model, including its version, description, training timestamp, input and output specifications, architecture, parameters, performance metrics, training dataset, dependencies, and usage terms. This information provides valuable insights into the characteristics, performance, and usage of a model, aiding in its effective deployment and utilization for various tasks and applications.

In an instance of checking model server readiness 430, a sequence diagram of FIG. 4 depicts that the client initiates a request for readiness check to the inference server 134. Subsequently, the inference server 134 may communicate with the model server 132 to conduct the readiness check. Upon verification, the model server 132 may send a response indicating its readiness status back to the inference server 134, which may relay this response back to the client 105. Model server readiness may refer to the state where the model server 132 is properly initialized and prepared to handle inference requests efficiently, confirming timely and accurate responses to client requests.

In the context of a model server 132, a model shard may refer to a partition or subset of a machine-learning model that is divided or segmented for distribution and parallel processing across multiple computational resources or nodes. Instead of loading the entire model onto a single server or computational node, the model can be partitioned into smaller shards, with each shard comprising a portion of the parameters, layers, or components of the model. These model shards can then be distributed across multiple servers or computational nodes within a cluster, allowing for parallel inference processing and reducing the computational load on individual servers.

For inference tasks, such as a client request of posting generated text 435, model inference may encompass various stages. For example, client requests may be received from the API server or inference service 405, after selection of an appropriate inference server and validation the request may be pushed to a buffer 410. Request buffering and batching related to the input may be optionally performed. In this setting, the incoming inference requests may be temporarily stored in a buffer 410 or queue until a number of requests have accumulated to form a batch. This buffering mechanism may help smooth out request processing and mitigate fluctuations in request arrival rates. It may also allow the inference server 134 to handle bursts of incoming requests more effectively without overloading the system or causing delays. Batcher 415 may involve grouping multiple inference requests together into a single batch before forwarding them to the model server 132 for processing. Then these requests in a batch may be routed to the relevant shard corresponding to a specific LLM model of the model server 132. Following these, inference against the model can be conducted, with subsequent returning or streaming of the output to the client, as illustrated in the block 435 of the sequence diagram of the FIG. 4. Various operations, such as telemetry capture, or provision of metadata of model server 132 and/or inference server 134 may also be included while handling a request. These operations may be abstracted into an inference server 134 responsible for managing request handling and batching, and a model server 132 tasked with performing inference on the underlying model.

During the first pass of generative inference, the attention matrix for the entire input sequence may be calculated. In this context, the input sequence is often referred to as the "prefill." For example, given the input, "What is the capital of France?", the attention matrix for this entire input is computed. Subsequent passes during generative inference may involve generating tokens sequentially, such as "The—capital—of—France—is—Paris—EOS.", where EOS refers to an end of sentence. During each of these passes, only the attention for the new token needs to be computed. These subsequent passes are referred to as "decode." The inference server 134 may generate the attention matrix for the prefill (the initial input sequence), which may be then cached in GPU memory. This cached attention matrix may be used for subsequent decode requests that involve the same input sequence. This caching process, specifically caching the attention key and value tensors, is also known as "KV Cache." If the server responsible for processing a request fails unexpectedly or if the request is redirected to a different server for some reason, the prefill operation may be re-evaluated and stored again for the particular set of input tokens received by the new inference server 134.

The inference server 134 and the model server 132 may work together during continuous batching that refers to the practice of decoding a batch of prompts (input sequences) in succession, rather than decoding them one by one. The inference server 134 may forward the inferencing request to the model server 132. Upon receiving the inferencing request, the model server may generate attention key and tensor value pairs that may be then cached in GPU memory. Generating these attention key and value tensors may be considered a computationally demanding step in the process. Batching may also be responsible to remove the request once the inference request has been finished: either the model produced EOS (end of sentence) token, or the inference request has reached the allowed limit of tokens.

The security of GenAI model weights within a cloud platform 107 is important, as the learned weights are intellectual property that an organization has invested in. Securing the weights with a robust defense against unauthorized access, tampering, and potential breaches may be a strategic decision. Such securing can be performed using a multifaceted role in data protection, encompassing safeguarding of intellectual property by preventing illegitimate acquisition and misuse of proprietary weights. Simultaneously, it may also protect and shield any exposure of the training data that is encoded within these weights. It may not allow illegitimate changes to the proprietary weights, as this could significantly degrade the accuracy and performance of a machine-learning model. This security system may also be compliant with regulatory standards, notably adhering to stringent data protection regulations, such as the general data protection regulation (GDPR). Finally, the security can be configured to thwart countering attempts aimed at manipulating or exploiting the integrity of the model itself.

Figure 5:
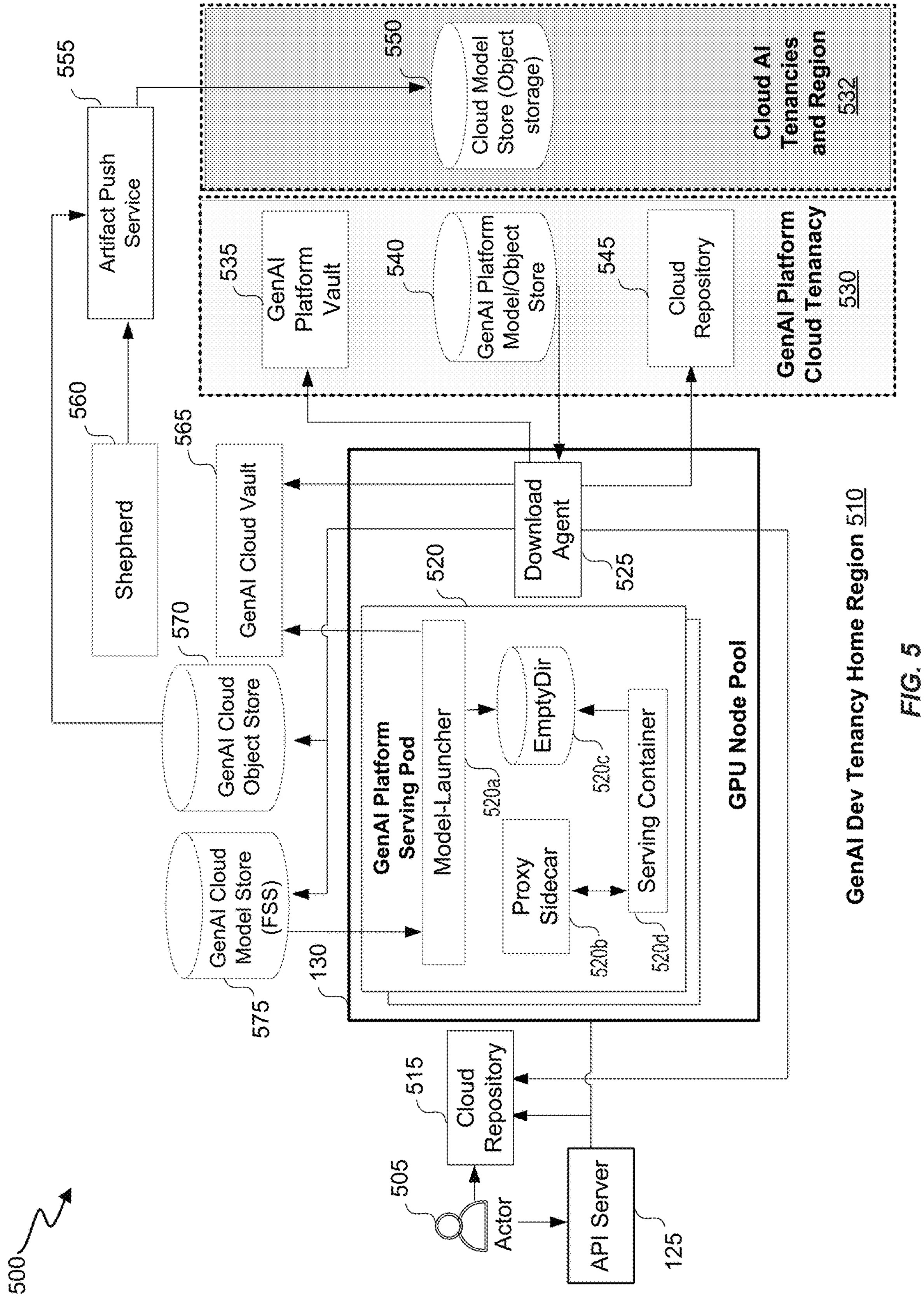
FIG. 5 illustrates various components of a cloud infrastructure hosting a GenAI platform for an encryption of weights of a model in accordance with some embodiments of the present disclosure.

To enable the security of GenAI platform and weights of GenAI model, the present disclosure provides a system for encrypting the model weights using the GenAI platform secrets as illustrated in FIG. 5. The system may comprise a GenAI development (dev) tenancy home region 510, a GenAI platform cloud tenancy 530 and cloud AI tenancies and region 532. A GenAI development tenancy home region 510, herein after as GenAI home, in a cloud context may refer to a primary data center or geographic region where a dedicated tenancy for Gen AI development may be established and managed within a cloud 107. This chosen region may serve as the central hub for provisioning and managing infrastructure, services, and resources related to GenAI development. For example, it could be "us-ashburn-1" for a cloud tenancy based in Ashburn, Virginia, USA, or "eu-frankfurt-1" for a tenancy located in Frankfurt, Germany.

The decision as to which region is to be designated as the home region can be made by a cloud user or an administrator who is responsible for setting up the GenAI development environment within a cloud 107. The choice of home region can be made by considering factors, such as proximity to users or data sources, compliance requirements, and the availability of specific GenAI services within that region. It may essentially dictate where the core infrastructure for GenAI development can reside within the cloud infrastructure.

A GenAI platform cloud tenancy 530 may be a specific portion of a cloud infrastructure designated for hosting and integrating a GenAI platform. It may provide isolated resources and the environment that is needed for GenAI-related operations within the cloud. The cloud AI tenancy and region 532 may refer to the data centers where a dedicated tenancy for GenAI development is established and managed within a cloud for remote regions. The GenAI home 510 may comprise of a GPU node pool 130, one or more GenAI model stores 570, GenAI object store 575 (e.g., 140 of FIG. 1) and a GenAI cloud vault 565. The GPU node pool 130 may host the pods that use GPU resources for machine-learning workloads. It may further include a plurality of GenAI platform serving pods 520 and a download agent 525 for securely retrieving encrypted model weights from GenAI platform cloud tenancy 530. The GenAI platform serving pods 520 may include a model launcher 520*a*, serving containers 520*d*, and EmptyDir 520*c* that is used for temporary, in-memory storage within the serving pods 520. Within each GenAI platform serving pods 520, serving containers 520*d* may run machine-learning models and associated components. The model launcher 520*a* may be responsible for initializing and managing serving containers 520*d*.

An actor 505, such as a developer or data scientist, may interact with the GenAI platform cloud tenancy 530 through API server 125 to manage secure access to machine-learning models. The GenAI platform cloud tenancy 530 may include a GenAI platform vault 535, a GenAI platform model store 540 and a cloud repository (CR) 545. The GenAI platform cloud tenancy 530 may store model weights and related assets securely in a GenAI platform model store 540. These model weights are encrypted with GenAI platform keys, also referred to as DEK (data encryption key) that can be managed by GenAI vault 535. Each key may be associated with the specific set of model weights. For example, a large GPT (generative pre-trained transformers) model version 1 may be associated with a secret command, such as "gpt-xl-v20230131".

When the GenAI platform serving pods 520 may require model weights for inference or other predictive tasks, retrieval may occur from the GenAI cloud model store 570. This retrieval may be facilitated by a service gateway (e.g., a download agent 525) in GenAI home region 510, such that only a specific pod has the read access to GenAI platform model storage 540 and vault 535. Once retrieved, the download agent 525 may again encrypt the model weights using GenAI cloud security keys (GAIS), also referred to as KEK (key encryption key), after decryption with GenAI platform key (DEK). The GAIS keys (KEK) for GenAI model weights may be managed by the GenAI cloud vault 565 or key management service (KMS) within the GenAI home region 510.

The encrypted model weights can be pushed to both GenAI cloud object store 570 and GenAI model store 575. Storing model weights in cloud object store 570 (e.g., AWS S3, Oracle cloud storage) may allow for redundancy and fault tolerance within the same region. By storing model weights in the GenAI model store 575 for serving cloud FSS (file storage system), the optimized infrastructure and capabilities of the FSS for serving model weights can be leveraged efficiently to applications or systems that require them for inference or other tasks. This setup enables that model weights to be readily accessible and can be efficiently utilized by various components within the cloud environment. Model weights stored in regions other than the GenAI home region 510, such as pre-production (pre-prod) and production (prod) environments, can be replicated through shepherd module 560 from the GenAI service development region. Furthermore, the DEK keys can be managed by the cloud 107 to enable granular access controls and policies to maintain the secrecy of the weights.

When the GenAI platform uses the model weights for inference or other predictive tasks, it may request the decryption keys from the GenAI vault 535 within KMS. The weights can be decrypted on-demand at runtime and can then be used by machine-learning models to perform inference. This comprehensive security architecture may protect model weights throughout their lifecycle and protect sensitive machine-learning models from unauthorized access. This approach may also improve the confidentiality and integrity within a cloud-based GenAI platform.

In each serving container start up, the model-launcher 520*a* can decrypt the model weights with GAIS key and forward the model weights to the inference server 134 within serving containers 520*d*. This forwarding may be facilitated via EmptyDir 520*c* with medium as memory to load the model weights, where the model weights can be removed from the local storage after the confirmation of GPU node pool 130. For example, Triton server to handle inference tasks so that the model weights are no longer needed in memory. The proxy sidecar 520*b* in GenAI platform serving pods 520 serves as an intermediary for load balancing, service discovery, security enforcement, traffic routing, and monitoring within microservices architecture of the pods. Furthermore, the GenAI platform keys (DEK) can be managed by cloud to enable granular access controls and policies to maintain the secrecy of the weights. The disclosed system may be hosting two types of pre-trained large language models, open-source models and models obtained through the clients, such as GenAI platform. Open-source models may go through the traditional shepherd 560 deployment process. Artifacts may be stored in artifact push service 555 and cloud artifact storage including GenAI cloud object storage 570 and model storage (FSS) 575.

Figure 6:
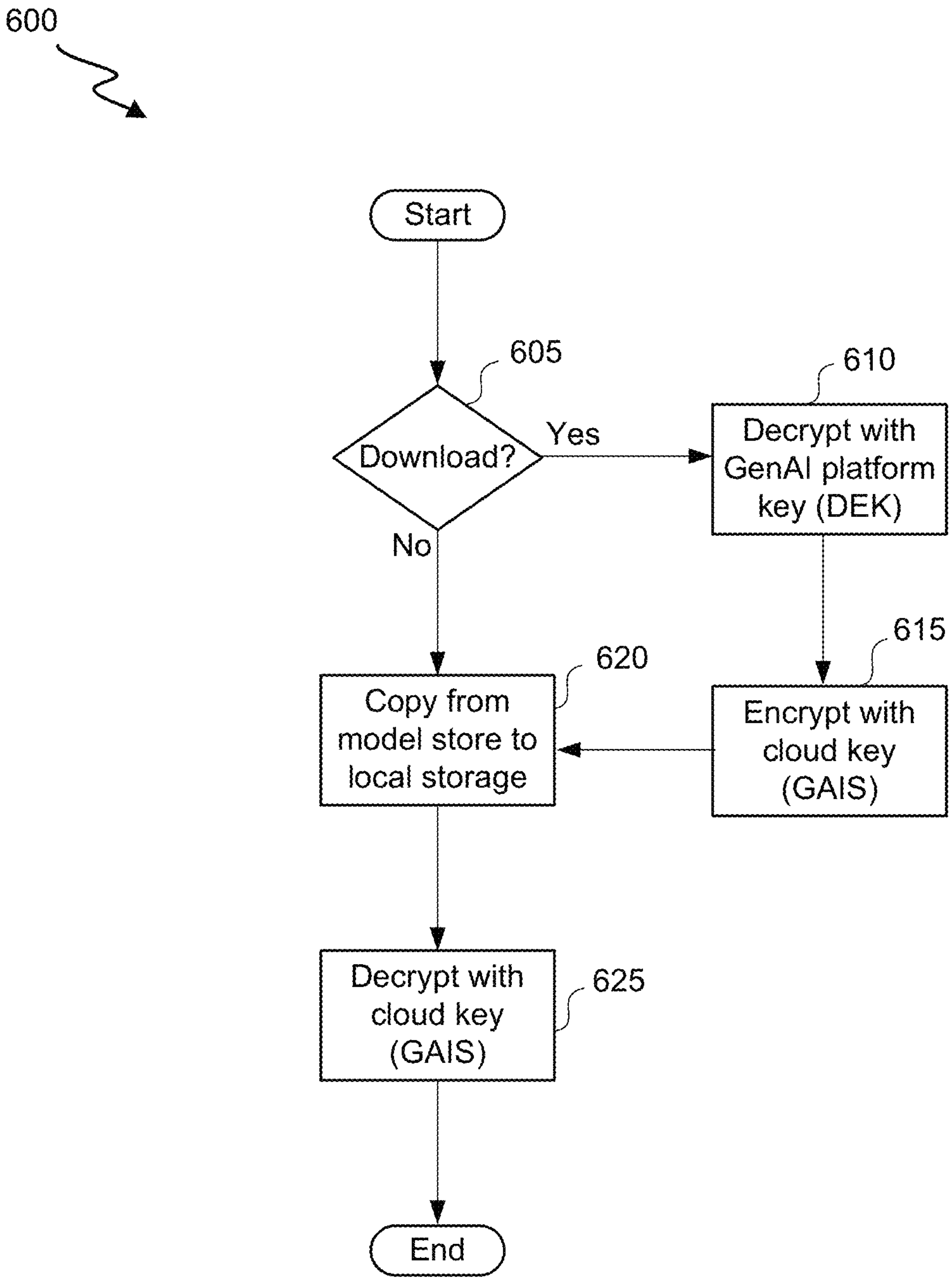
FIG. 6 shows an exemplary flow of a process, performed by a download agent for retrieving model weights from the GenAI platform integrated in the cloud.

FIG. 6 illustrates an example flowchart showing the working of a download agent 525. The download agent 525 may be responsible for securely retrieving encrypted model weights from GenAI platform model store 540 in GenAI platform tenancy 530, decrypting them with GAIS key (KEK), and making them available to the GenAI platform or serving containers 520*d* for use in GenAI services, such as model inference tasks. In FIG. 6, a decision box 605 is used to determine whether the model weights are downloaded or not. In case the model weights are not downloaded, then the model weights can be copied from the GenAI platform model store 540 to the local storage 570 in GenAI home region 510, at block 620. At block 610, if the model weights are downloaded from the GenAI platform model store 540, weights can be decrypted using the GenAI platform key i.e., DEK stored in a GenAI platform vault 535. The downloaded weights may only be downloaded in GenAI home region 510 such that only the specific pods have the read access to GenAI platform object storage 540 and vault 535. At block 615, the model weights may be encrypted with a cloud secret key i.e., GAIS (KEK) obtained from the GenAI cloud vault 565. At block 620, model weights can be copied from GenAI platform model store 540 to the local storage for doing replication. At block 625, the model launcher 520*a* may decrypt the model weights with GAIS key (KEK). The model weights can be pushed into GenAI cloud model store (FSS) 575 and the GenAI cloud object store 570 in the GenAI home region 510 for replication.

Figure 7:
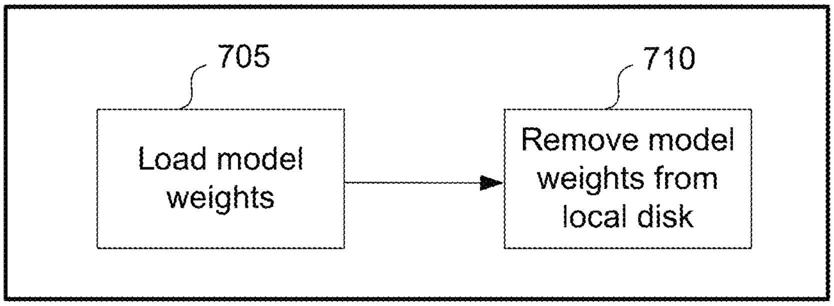
FIG. 7 illustrates components of a model launcher process within a GenAI platform serving pod in accordance with some embodiments of the present disclosure.

FIG. 7 illustrates an example architecture of a model launcher 700 (or 520*a*) that may facilitate loading and removal of model weights within a serving pod. The model launcher 700 may provide the interaction with serving containers 520*d* and GenAI platform serving pods 520 within a cloud platform 107. The model launcher 700 (or 520*a*) may be responsible for loading the model weights in module 705 from a GenAI cloud model store 575. In each serving container 520*d*, the model launcher 700 after loading, may decrypt the model weights with the KEK and pass the model weights to an inference server within the serving container 520*d* of GenAI platform via EmptyDir 520*c* to load the model weights. This is done because reading data from memory is faster than reading from the disk when doing real-time model inference with a low latency is desired. Finally, at 710, the model launcher may remove the model weights from the local disk within cloud home region 510. The local disk or EmptyDir 520*c* after the confirmation of GPU node pool 130, such as Triton server to handle inference tasks so that the model weights are not residing in the memory. By deleting these model weights, the cloud may not have access to the decrypted model weights of the GenAI platform. This method may provide a robust and secure deployment of proprietary data and intellectual property and avoid potential data breaches or leakages.

Figure 8:
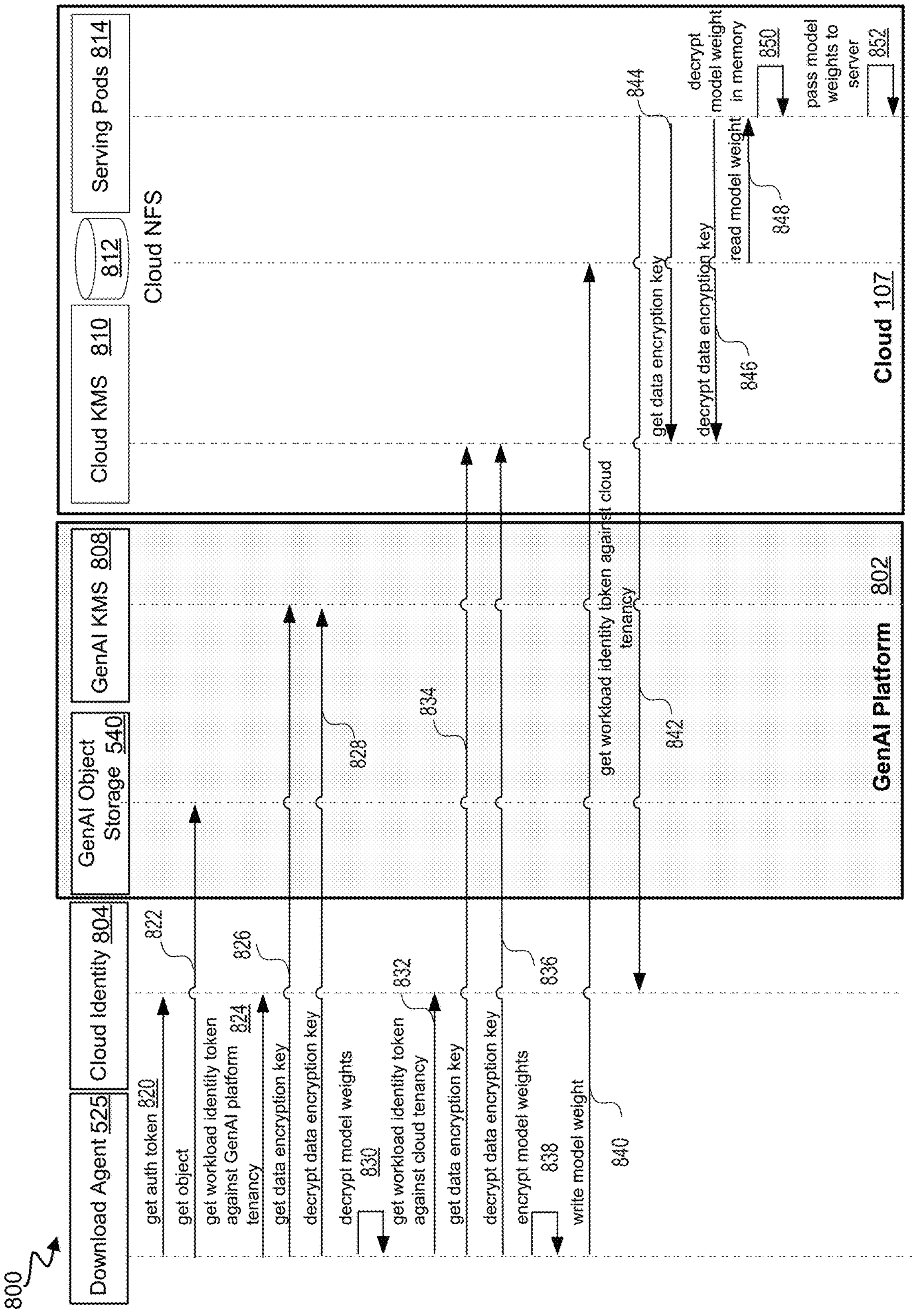
FIG. 8 shows an exemplary sequence diagram of actions that are followed in encrypting model weights and safely routing the encryption keys in an envelope encryption process.

FIG. 8 illustrates an example sequence diagram that explains the temporal sequence of actions involved in encrypting the model weights and safely routing information between different components of the system. This workflow is important because model weights include valuable information about the underlying neural network. Model weights can be encrypted with GenAI platform keys (DEK). This architecture shows the workflow between the downloading agent 525, GenAI platform 802 and cloud 107.

In envelope encryption, each key is associated with only one set of model weights to provide security of the GenAI platform models, including but not limited to, the inference method and weights of LLM. To download the encrypted model weights, the process initiates at block 820 where a cloud identity 804 may receive the authentication token from the download agent 525. The cloud identity 804, such as OCI (Oracle cloud infrastructure) identity, can be an important component of cloud computing platform. Cloud identity 804 is a unique identity that may provide an access management (IAM) service and enable organizations to securely manage users, groups, policies, and other resources within the cloud environment.

GenAI platform object storage 540 is a type of storage architecture, owned by GenAI platform, for storing and managing unstructured data, typically in the form of objects or files. Encrypted model weights can be stored in a cloud object storage e.g., 540 in GenAI platform tenancy. After acquiring authentication token, the downloading agent 525 may get model object from the GenAI platform object storage 540 at 822. At 824, the download agent 525 may retrieve the workload identity (permissions and authorizations) token against GenAI platform tenancy 802 from the cloud identity 804. At block 826, data encryption key (DEK) is acquired from GenAI KMS 808 in GenAI platform 802.

Then, at 828, DEK may get decrypted through GenAI KMS 808 by the KEK. By using these keys, the model weights can be decrypted at the downloading agent 525 at block 830. Then an authentication token may be required by the download agent 525 to securely communicate with a cloud platform 107. At 832, the download agent 525 may receive the workload identity token against cloud tenancy 107. At 832, the download agent 525 may interact with cloud 107 in GenAI home region 510, which is again initiated through IAM 150 in cloud identity 804.

In FIG. 8, three components of the cloud 107 are illustrated involved in envelope encryption process including, cloud network file system (NFS) 812, cloud KMS 810, and cloud serving pods 814. In the context of cloud, a KMS 810 may be used to manage encryption keys for securing data at rest or in transit. It may provide encryption and protection of sensitive information, including model weights and user data. The download agent 525 may then retrieve the data encryption key (KEK) from the cloud KMS at 834 and use it to decrypt at subsequent stage 836. At 838, the model weights can again be encrypted by the download agent 525 and subsequently stored on the cloud NFS 812, at 840. Cloud NFS 812 may be used to provide a shared file system where the service stores and accesses data or model files. This shared file system may provide that data and model files are consistent and accessible to different components of a cloud service 107. The serving pods 814 may interact with the cloud identity 804 to acquire the workload identity against cloud tenancy, at 842. At 844, the serving pods 814 may retrieve the data encryption key from the cloud KMS 810 and perform decryption at 846 with KEK. At 848, the model weights stored in the serving pods 814 can be retrieved by the cloud NFS 812. The model weights can be decrypted in the memory of the serving pods 814, at 850. At 852, the model weights can be passed to a GPU node server that resides within the serving pod 814 via memory mapped file, which is an open-source inference serving software that streamlines AI inferencing.

Figure 9:
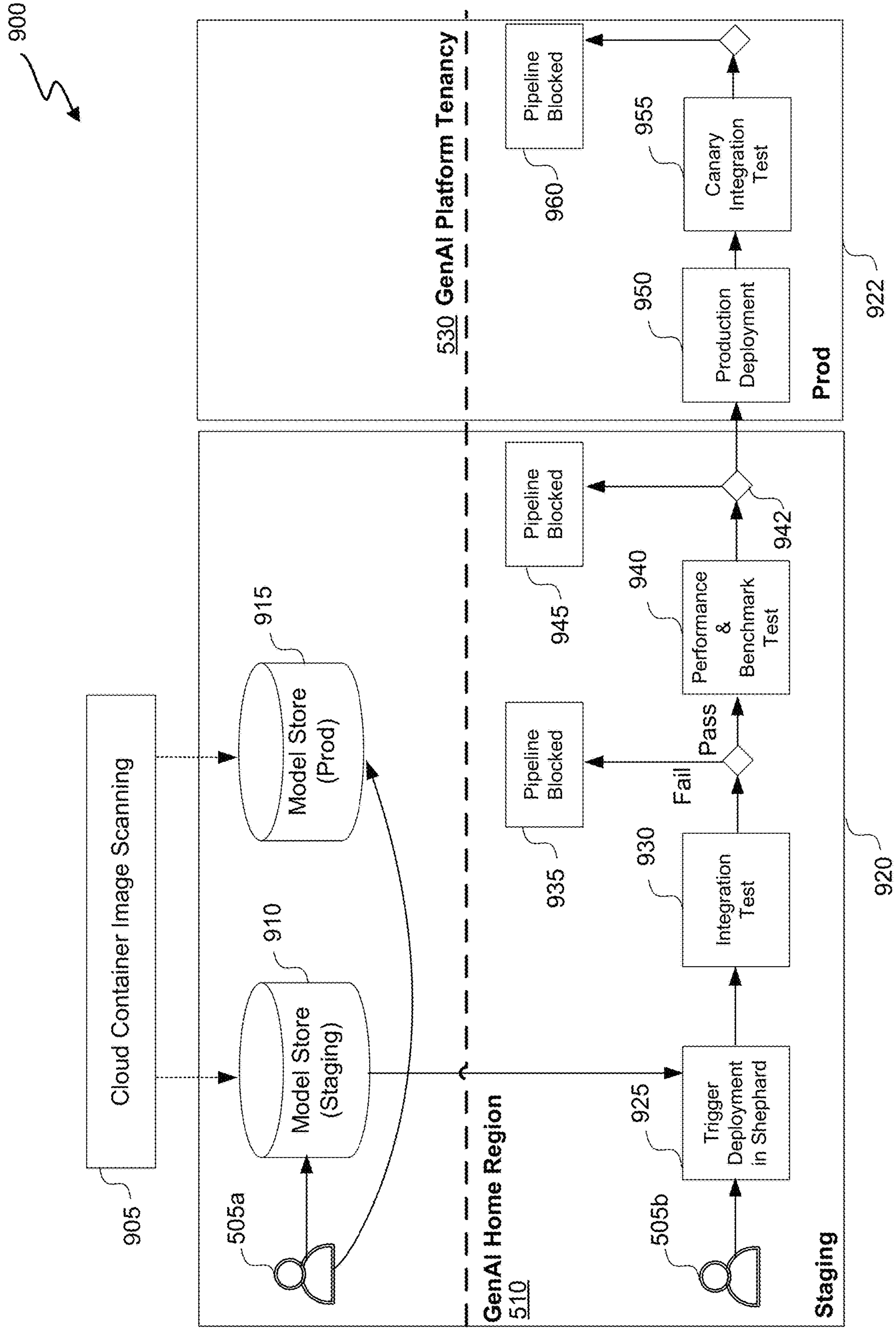
FIG. 9 illustrates an exemplary CI/CD (continuous integration/continuous deployment) model pipeline architecture that is built on the cloud architecture.

It may be important to orchestrate the deployment of GenAI platform to provide the GenAI service availability. Therefore, a CI/CD (continuous integration/continuous deployment) pipeline is fully built in a cloud and presented in FIG. 9. The architecture 900 may comprise of two phases of GenAI platform cloud tenancy 530 and GenAI home region 510, a staging phase 920 and a production phase 922 namely "Prod". In staging phase 920, testing, quality assurance, and validation of new features or updates can be performed before forwarding them to the production phase. The staging phase 920 may involve a deployment orchestrator that manages the entire workflow of the staging deployment process. This may include handling the life cycle of integration tests, performance tests, and finalization. The Prod 922 may be the final deployment phase in CI/CD pipeline where changes can be released to the live, customer-facing production environment. It may refer to a deployment orchestrator that manages the entire workflow of the production deployment process. This may include handling the life cycle of integration tests, canary tests, and finalization. The goal may be the provision of tested and validated code to GenAI clients 105. A model store in GenAI platform typically refers to a repository or storage system where machine-learning models and their associated artifacts, such as weights, configurations, and metadata, can be stored and managed. In FIG. 9, a model store (staging) 910 and model store (Prod) 915 is shown in GenAI cloud platform tenancy 530. In both, the staging model store 910 and the production model store 915, image registry can be embedded to the cloud container image scanning service 905 for auditing GenAI logs.

When certain changes are made in the machine-learning models or applications by the actors 505*a* and 505*b*, such as administrators, data scientists or developers, trigger deployment in shepherd 925 may be automatically initiated. At block 925, the shepherd may also retrieve the required model data to enable the deployment proceeds as planned. In a later stage 930, integration test may be performed. The integration test 930 may be important in the software development and deployment process, as it provides that various components or services work together correctly. It may validate the functionality by getting updates from either the model weights or the container image. The pipeline is blocked at block 935 if the integration tests fail. After successful integration test 930, at block 940, performance and benchmark tests can be performed that measure the performance of an inference service in terms of number of queries processed per second and their latencies. This may also aim to evaluate how well an application or AI model performs under various conditions and workloads, and if the performance is low, then CI/CD pipeline may block the process at 945. The check at 942 may help to enable a CI/CD pipeline to provide quality and performance standards before allowing code or updates from the progress to the production stage 922. It may also proactively identify and address performance issues, that ultimately leads to a more reliable and optimized system.

After the performance test is successfully completed in the staging phase 920 of CI/CD pipeline, the application or system may be passed onto the production deployment phase 950. This transition may indicate that the application has demonstrated satisfactory performance and is ready to be deployed to the production environment where it can serve the real users or customers. Lastly, performing a lightweight canary integration testing 955 may also be a part of the production process 922 in CI/CD pipelines to provide a smooth and controlled transition to the new version of an application or system. It may include a lightweight test in the production environment to make the system up and running and maintain an end-to-end functionality. The pipeline may be blocked again at block 960 if the test fails.

Figure 10:
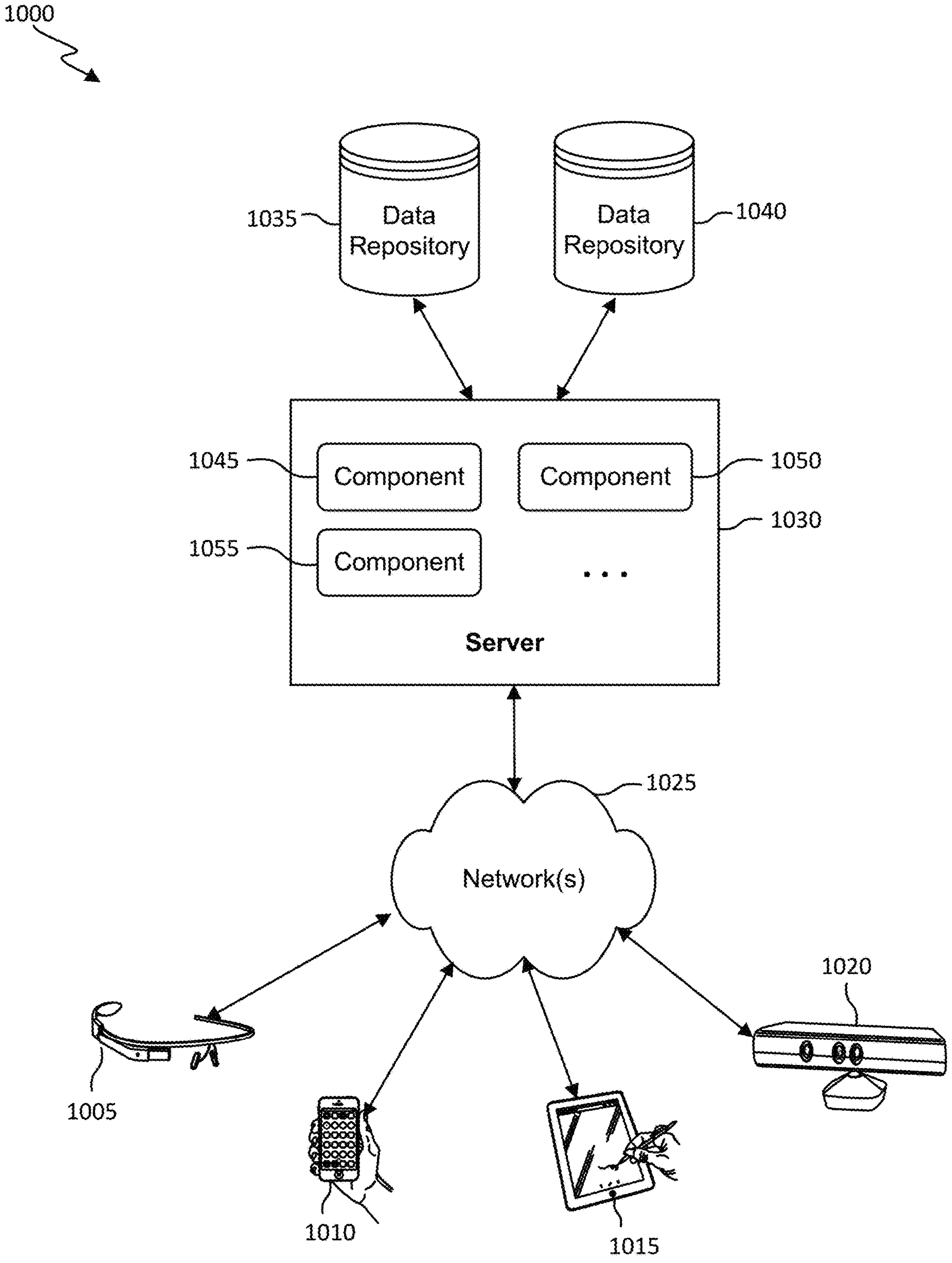
FIG. 10 illustrates a simplified diagram of an example distributed system for the cloud hosting the GenAI platform.

FIG. 10 illustrates a simplified diagram of an example distributed system 1000 for a cloud hosting a GenAI platform. In the illustrated example, distributed system 1000 includes one or more client computing devices 1005, 1010, 1015, and 1020, coupled to a server 1030 via one or more communication networks 1025. Clients computing devices 1005, 1010, 1015, and 1020 may be configured to execute one or more applications interact with the server 1030 to access and utilize the GenAI platform securely integrated within a cloud environment, such as Oracle cloud integrated with Cohere. Within this framework, server 1030 is configured to host and manage a range of services or software applications, facilitating seamless integration and operation of the GenAI platform.

In various aspects, server 1030 may extend its capabilities to encompass additional services or software applications. These services may span both virtual and non-virtual environments, enabling a comprehensive and adaptable infrastructure for securely deploying GenAI solutions within the cloud ecosystem. In some respects, these services may be offered as web-based or cloud services, such as under a Software as a Service (Saas) model to the users of client computing devices 1005, 1010, 1015, and/or 1020. Users operating client computing devices 1005, 1010, 1015, and/or 1020 may in turn utilize one or more client applications to interact with server 1030 to utilize the services provided by these components. Furthermore, client computing devices 1005, 1010, 1015, and/or 1020 may in turn utilize one or more client applications to initiate and manage specific tasks or analyses within the GenAI platform.

In the configuration depicted in FIG. 10, server 1030 may include one or more components 1045, 1050 and 1055 that implement the functions performed by server 1030. These components may include software components that may be executed by one or more processors, hardware components, or combinations thereof. It should be appreciated that various different system configurations are possible, which may be different from distributed system 1000. The example shown in FIG. 10 is thus one example of a distributed system for implementing an example system and is not intended to be limiting.

Users may initiate requests for the GenAI platform through client computing devices 1005, 1010, 1015, and/or 1020 for inference or other machine-learning tasks. A client device may provide an interface that enables a user of the client device to interact with the GenAI platform. The client device may also output information to the user via this interface. Although FIG. 10 depicts only four client computing devices, any number of client computing devices may be supported providing scalability and accessibility within the integrated GenAI platform on the cloud.

The client devices may include various types of computing systems, such as portable handheld devices, general purpose computers, such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems, such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various applications, such as various Internet-related apps, communication applications (e.g., E-mail applications, short message service (SMS) applications) and may use various communication protocols.

Network(s) 1025 may be any type of network familiar to those skilled in the art that can support data communications using any of a variety of available protocols, including without limitation TCP/IP (transmission control protocol/internet protocol), SNA (systems network architecture), IPX (internet packet exchange), AppleTalk®, and the like. Merely by way of example, network(s) 1025 can be a local area network (LAN), networks based on ethernet, token-ring, a wide-area network (WAN), the internet, a virtual network, a virtual private network (VPN), an intranet, an extranet, a public switched telephone network (PSTN), an infra-red network, a wireless network (e.g., a network operating under any of the institute of electrical and electronics (IEEE) 1002.11 suite of protocols, Bluetooth®, and/or any other wireless protocol), and/or any combination of these and/or other networks.

Server 1030 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1030 can include one or more virtual machines running virtual operating systems, or other computing architectures involving virtualization, such as one or more flexible pools of logical storage devices that can be virtualized to maintain virtual storage devices for the server. In various aspects, server 1030 may be adapted to run one or more services or software applications that provide the functionality described in the foregoing disclosure.

The computing systems in server 1030 may run one or more operating systems including any of those discussed above, as well as any commercially available server operating system. Server 1030 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

Distributed system 1000 may also include one or more data repositories 1035, 1040. Data repositories 1035, 1040 may reside in a variety of locations. For example, a data repository used by server 1030 may be local to server 1030 or may be remote from server 1030 and in communication with server 1030 via a network-based or dedicated connection. Data repositories 1035, 1040 may be of different types. In certain aspects, a data repository used by server 1030 may be a database, for example, a relational database, such as databases provided by Oracle Corporation® and other vendors. One or more of these databases may be adapted to enable storage, update, and retrieval of data to and from the database in response to structured query language (SQL)-formatted commands. In certain aspects, one or more data repositories 1035, 1040 may also be used by applications to store application data. The data repositories used by applications may be of different types, such as, for example, a key-value store repository, an object store repository, or a general storage repository supported by a file system.

Figure 11:
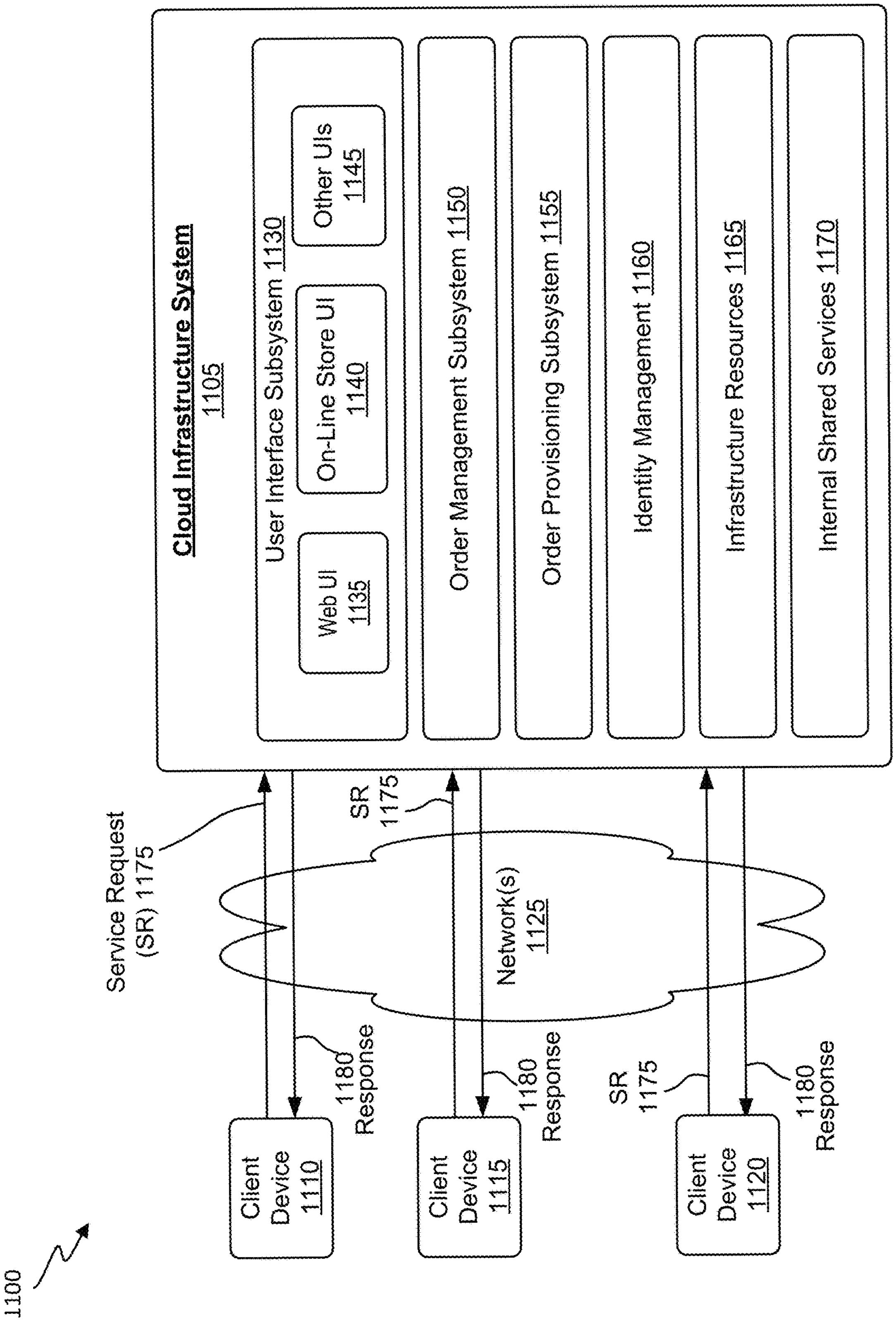
FIG. 11 is a simplified block diagram of a cloud-based system environment in which various services of a server of the FIG. 10 may be offered as cloud services, in accordance with certain aspects.

FIG. 11 is a simplified block diagram of a cloud-based system environment in which various services of server 1030 of FIG. 10 may be offered as cloud services, in accordance with certain aspects. In the illustrative example depicted in FIG. 11, cloud infrastructure system 1105 may provide one or more cloud services that may be requested by users using one or more client devices 1110, 1115, and 1120. Cloud infrastructure system 1105 may comprise one or more computers and/or servers that may include those described for server 1030. The computers in cloud infrastructure system 1105 may be organized as general-purpose computers, specialized server computers, server farms, server clusters, or any other appropriate arrangement and/or combination.

Network(s) 1125 may facilitate communication and exchange of data between clients 1110, 1115, and 1120 and cloud infrastructure system 1105. Network(s) 1125 may include one or more networks. The networks may be of the same or different types. Network(s) 1125 may support one or more communication protocols, including wired and/or wireless protocols, for facilitating the communications.

The illustrative example depicted in FIG. 11 is only one example of a cloud infrastructure system 1105 and is not intended to be limiting. It should be appreciated that, in some other aspects, cloud infrastructure system 1105 may have more or fewer components than those depicted in FIG. 11, may combine two or more components, or may have a different configuration or arrangement of components. For example, although FIG. 11 depicts three client computing devices, any number of client computing devices may be supported in alternative aspects.

The term cloud service is generally used to refer to a service that is made available to users on demand and via a communication network, such as the internet by systems (e.g., cloud infrastructure system 1105) of a service provider. Typically, in a public cloud environment, servers and systems that make up the cloud service provider's system are different from the client's own on-premises servers and systems. The cloud service provider's systems are managed by the cloud service provider. Clients can thus avail themselves of cloud services provided by a cloud service provider without having to purchase separate licenses, support, or hardware and software resources for the services. For example, a cloud service provider's system may host an application, and a user may, via a network 1125 (e.g., the internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain aspects, cloud infrastructure system 1105 may provide one or more cloud services using different models, such as under a Software as a Service (SaaS) model, a Platform as a Service (PaaS) model, an Infrastructure as a Service (IaaS) model, and others, including hybrid service models. Cloud infrastructure system 1105 may include a suite of applications, middleware, databases, and other resources that enable provision of the various cloud services.

A SaaS model enables an application or software to be delivered to a client over a communication network like the Internet, as a service, without the client having to buy the hardware or software for the underlying application. For example, a SaaS model may be used to provide clients access to on-demand applications that are hosted by cloud infrastructure system 1105. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a client as a cloud service to provide elastic compute and storage capabilities. Various IaaS services are provided by Oracle Corporation®.

A PaaS model is generally used to provide, as a service, platform and environment resources that enable clients to develop, run, and manage applications and services without the client having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a client, via a subscription order, may order one or more services provided by cloud infrastructure system 1105. Cloud infrastructure system 1105 then performs processing to provide the services requested in the client's subscription order. Cloud infrastructure system 1105 may be configured to provide one or even multiple cloud services.

Cloud infrastructure system 1105 may provide cloud services via different deployment models. In a public cloud model, cloud infrastructure system 1105 may be owned by a third-party cloud services provider and the cloud services are offered to any general public client, where the client can be an individual or an enterprise. In certain other aspects, under a private cloud model, cloud infrastructure system 1105 may be operated within an organization (e.g., within an enterprise organization) and services provided to clients that are within the organization. For example, the clients may be various departments of an enterprise, such as the Human Resources department, the payroll department, etc. or even individuals within the enterprise. In certain other aspects, under a community cloud model, the cloud infrastructure system 1105 and the services provided may be shared by several organizations in a related community. Various other models, such as hybrids of the above-mentioned models may also be used.

Client computing devices 1110, 1115, and 1120 may be of several types (such as devices 1005, 1010, 1015, and 1020 depicted in FIG. 10) and may be capable of operating one or more client applications. A user may use a client device to interact with cloud infrastructure system 1105, such as to request a service provided by cloud infrastructure system 1105. For instance, a user might employ a client device to execute real-time data querying operations within the cloud. A GenAI client may use a client device, such as a laptop to interact with the GenAI platform integrated within cloud infrastructure system. The client may request GPU-accelerated computing instances of the cloud for training deep learning models. The cloud may provide the necessary resources, and the GenAI client may monitor and manage the training process through the laptop. Upon completion, the client may retrieve the trained models and results.

In certain aspects, to facilitate efficient provisioning of these resources for supporting the various cloud services provided by cloud infrastructure system 1105 for different clients, the resources may be bundled into sets of resources or resource modules (also referred to as "pods" or GenAI serving pods 520). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1105 may comprise multiple subsystems. These subsystems may be implemented in software, or hardware, or combinations thereof. As depicted in FIG. 11, the subsystems may include a user interface subsystem 1130 that enables users or clients of cloud infrastructure system 1105 to interact with cloud infrastructure system 1105. User interface subsystem 1130 may include various interfaces, such as a web user interface 1135, an online store interface 1140 where cloud services provided by cloud infrastructure system 1105 are advertised and are purchasable by a consumer, and other interfaces 1145. For example, a client may, using a client device, request (service request 1175) one or more services provided by cloud infrastructure system 1105 using one or more of interfaces 1135, 1140, and 1145. For example, a client may access the online store, browse cloud services offered by cloud infrastructure system 1105, and place a subscription order for one or more services offered by cloud infrastructure system 1105 that the client wishes to subscribe to. The service request may include information identifying the client and one or more services that the client desires to subscribe to. For example, a client may place a subscription order for a Chabot related service offered by cloud infrastructure system 1105. As part of the order, the client may provide information identifying for input (e.g., utterances).

In certain aspects, such as the illustrative example depicted in FIG. 11, cloud infrastructure system 1105 may comprise an order management subsystem (OMS) 1150 that is configured to process the new order. As part of this processing, OMS 1150 may be configured to: create an account for the client, if not done already; receive billing and/or accounting information from the client that is to be used for billing the client for providing the requested service to the client; verify the client information; upon verification, book the order for the client; and orchestrate various workflows to prepare the order for provisioning.

Once properly validated, OMS 1150 may then invoke the order provisioning subsystem (OPS) 1155 that is configured to provision resources for the order including processing, memory, and networking resources. The provisioning may include allocating resources for the order and configuring the resources to facilitate the service requested by the client order. The manner in which resources are provisioned for an order and the type of the provisioned resources may depend upon the type of cloud service that has been ordered by the client. For example, according to one workflow, OPS 1155 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting client for providing the requested service.

Cloud infrastructure system 1105 may itself internally use services 1170 that are shared by different components of cloud infrastructure system 1105 and which facilitate the provisioning of services by cloud infrastructure system 1105. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like. As depicted in the illustrative example in FIG. 11, cloud infrastructure system 1105 may include infrastructure resources 1165 that can be utilized for facilitating the provision of various cloud services offered by cloud infrastructure system 1105. Infrastructure resources 1165 may include, for example, processing resources, storage or memory resources, networking resources, and the like. Cloud infrastructure system 1105 may send a response or notification 1180 to the requesting client to indicate when the requested service is now ready for use. In some instances, information (e.g., a link) may be sent to the client that enables the client to start using and availing the benefits of the requested services.

Cloud infrastructure system 1105 may provide services to multiple clients in parallel. Cloud infrastructure system 1105 may store information for these clients, including possibly proprietary information. In certain aspects, cloud infrastructure system 1105 comprises an identity management subsystem (IMS) 1160 that is configured to manage client's information and provide the separation of the managed information such that information related to one client is not accessible by another client. IMS 1160 may be configured to provide various security-related services, such as identity services, such as information access management, authentication and authorization services, services for managing client identities and roles and related capabilities, and the like.

Figure 12:
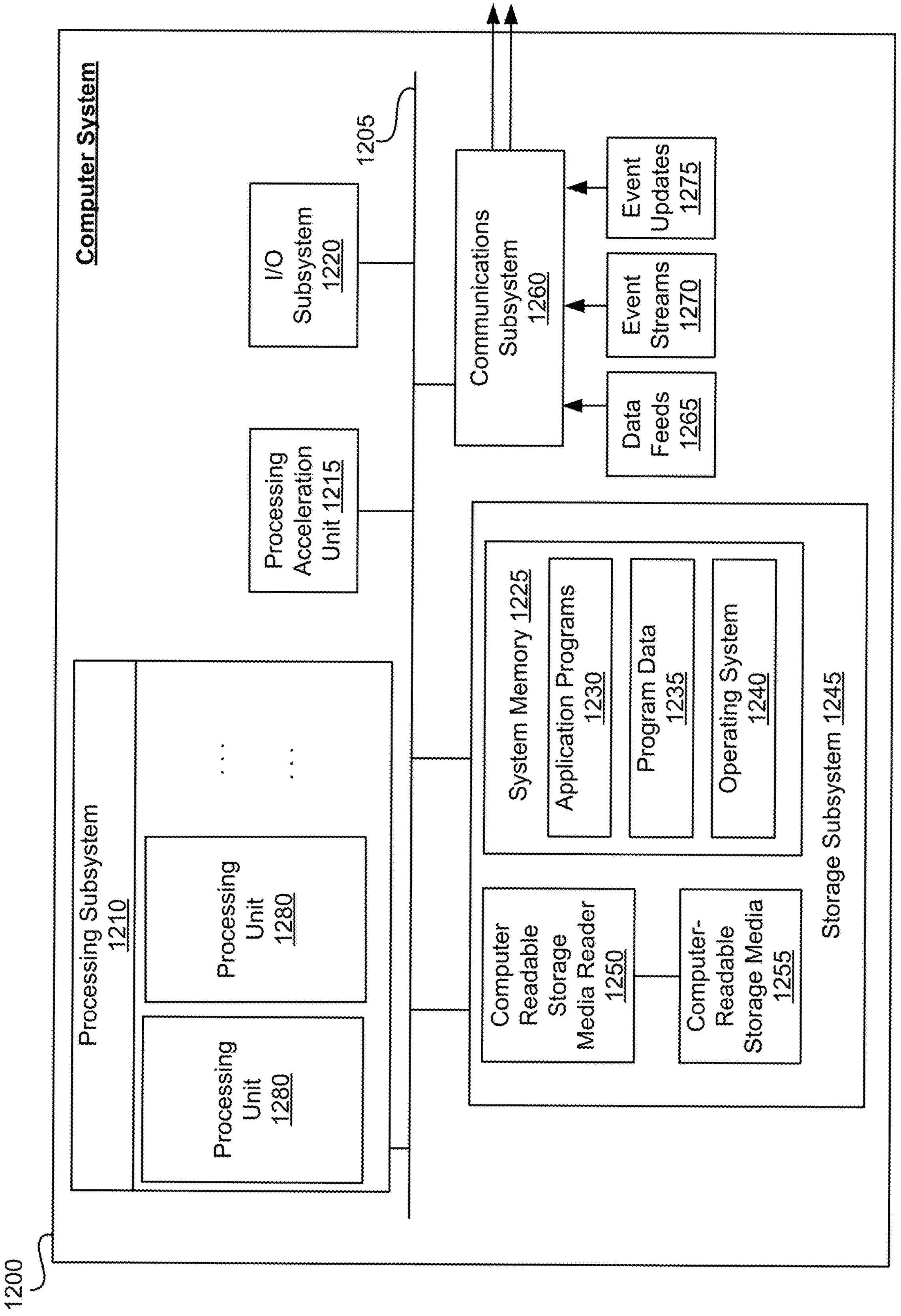
FIG. 12 illustrates an exemplary computer system to implement certain aspects of the present disclosure.

FIG. 12 illustrates an exemplary computer system 1200 that may be used to implement certain aspects of the present disclosure. For example, a computer system 1200 may facilitate the integration of a GenAI platform with the cloud by provisioning and configuring resources, managing data, implementing security measures, monitoring performance, and enabling scalability. It may serve as the foundational infrastructure, enabling seamless deployment and operation of AI applications within the cloud environment while providing flexibility and scalability to adapt to changing computational demands efficiently. In some aspects, computer system 1200 may be used to implement various servers as described above. As shown in FIG. 12, computer system 1200 may include various subsystems including a processing subsystem 1210 that communicates with a few other subsystems via a bus subsystem 1205. These other subsystems may include a processing acceleration unit 1215, an I/O subsystem 1220, a storage subsystem 1245, and a communications subsystem 1260. Storage subsystem 1245 may include non-transitory computer-readable storage media including storage media 1255 and a system memory 1225.

Bus subsystem 1205 provides a mechanism for letting the various components and subsystems of computer system 1200 communicate with each other as intended. Although bus subsystem 1205 is shown schematically as a single bus, alternative aspects of the bus subsystem may utilize multiple buses. Bus subsystem 1205 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1210 controls the operation of computer system 1200 and may comprise one or more processors, application specific integrated circuits (ASICs), or field programmable gate arrays (FPGAs). The processors may include single core or multicore processors. The processing resources of computer system 1200 can be organized into one or more processing units 1280, 1280, etc. A processing unit may include one or more processors, one or more cores from the same or different processors, a combination of cores and processors, or other combinations of cores and processors. In some aspects, processing subsystem 1210 can include one or more special purpose co-processors, such as graphics processors, digital signal processors (DSPs), or the like. In some aspects, some or all of the processing units of processing subsystem 1210 can be implemented using customized circuits, such as application specific integrated circuits (ASICs), or field programmable gate arrays (FPGAs).

In some aspects, the processing units in processing subsystem 1210 can execute instructions stored in system memory 1225 or on computer readable storage media 1255. In various aspects, the processing units can execute a variety of programs or code instructions and can maintain multiple concurrently executing programs or processes. At any given time, some, or all of the program code to be executed can be resident in system memory 1225 and/or on computer-readable storage media 1255 including potentially on one or more storage devices. Through suitable programming, processing subsystem 1210 can provide various functionalities described above. In instances where computer system 1200 is executing one or more virtual machines, one or more processing units may be allocated to each virtual machine.

In certain aspects, a processing acceleration unit 1215 may optionally be provided for performing customized processing or for off-loading some of the processing performed by processing subsystem 1210 to accelerate the overall processing performed by computer system 1200.

I/O subsystem 1220 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices, such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices, such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices, such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices, such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices, such as computed tomography, magnetic resonance imaging, position emission tomography, and medical ultrasonography devices. User interface input devices may also include, for example, audio input devices, such as MIDI keyboards, digital musical instruments, and the like.

In general, use of the term output device is intended to include all possible types of devices and mechanisms for outputting information from computer system 1200 to a user or other computer. User interface output devices may include a display subsystem, indicator lights, or non-visual displays, such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics, and audio/video information, such as monitors, printers, speakers, headphones, automotive navigation systems, plotters, voice output devices, and modems.

Storage subsystem 1245 provides a repository or data store for storing information and data that is used by computer system 1200. Storage subsystem 1245 provides a tangible non-transitory computer-readable storage medium for storing the basic programming and data constructs that provide the functionality of some aspects. Storage subsystem 1245 may store software (e.g., programs, code modules, instructions) that when executed by processing subsystem 1210 provides the functionality described above. The software may be executed by one or more processing units of processing subsystem 1210. Storage subsystem 1245 may also provide a repository for storing data used in accordance with the teachings of this disclosure.

Storage subsystem 1245 may include one or more non-transitory memory devices, including volatile and non-volatile memory devices. As shown in FIG. 12, storage subsystem 1245 includes a system memory 1225 and a computer-readable storage media 1255. System memory 1225 may include a number of memories including a volatile main random-access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1210. In some implementations, system memory 1225 may include multiple different types of memory, such as static random-access memory (SRAM), dynamic random-access memory (DRAM), and the like.

By way of example, and not limitation, as depicted in FIG. 12, system memory 1225 may load application programs 1230 that are being executed, which may include various applications, such as Web browsers, mid-tier applications, relational database management systems (RDBMS), etc., program data 1235, and an operating system 1240. By way of example, operating system 1240 may include various versions of Microsoft Windows®, Apple Macintosh® and/or Linux operating systems, a variety of commercially-available UNIX® or UNIX-like operating systems (including without limitation the variety of GNU/Linux operating systems, the Google Chrome® OS, and the like) and/or mobile operating systems, such as iOS, Windows® Phone, Android® OS, BlackBerry® OS, Palm® OS operating systems, and others.

Computer-readable storage media 1255 may store programming and data constructs that provide the functionality of some aspects. Computer-readable media 1255 may provide storage of computer-readable instructions, data structures, program modules, and other data for computer system 1200. Software (programs, code modules, instructions) that, when executed by processing subsystem 1210 provides the functionality described above, may be stored in storage subsystem 1245. By way of example, computer-readable storage media 1255 may include non-volatile memory, such as a hard disk drive, a magnetic disk drive, an optical disk drive, such as a CD ROM, digital video disc (DVD), a Blu-Ray® disk, or other optical media. Computer-readable storage media 1255 may include, but is not limited to, Zip® drives, flash memory cards, universal serial bus (USB) flash drives, secure digital (SD) cards, DVD disks, digital video tape, and the like. Computer-readable storage media 1255 may also include, solid-state drives (SSD) based on non-volatile memory, such as flash-memory based SSDs, enterprise flash drives, solid state ROM, and the like, SSDs based on volatile memory, such as solid state RAM, dynamic RAM, static RAM, dynamic random access memory (DRAM)-based SSDs, magneto resistive RAM (MRAM) SSDs, and hybrid SSDs that use a combination of DRAM and flash memory based SSDs.

In certain aspects, storage subsystem 1245 may also include a computer-readable storage media reader 1250 that can further be connected to computer-readable storage media 1255. Reader 1250 may receive and be configured to read data from a memory device, such as a disk, a flash drive, etc.

In certain aspects, computer system 1200 may support virtualization technologies, including but not limited to virtualization of processing and memory resources. For example, computer system 1200 may provide support for executing one or more virtual machines. In certain aspects, computer system 1200 may execute a program, such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1260 provides an interface to other computer systems and networks. Communications subsystem 1260 serves as an interface for receiving data from and transmitting data to other systems from computer system 1200. For example, communications subsystem 1260 may enable computer system 1200 to establish a communication channel to one or more client devices via the Internet for receiving and sending information from and to the client devices. For example, the communication subsystem may be used to transmit a response to a user regarding the inquiry for a Chabot.

Communication subsystem 1260 may support both wired and/or wireless communication protocols. For example, in certain aspects, communications subsystem 1260 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1260 can provide wired network connectivity (e.g., Ethernet) in addition to or instead of a wireless interface.

Communication subsystem 1260 can receive and transmit data in various forms. For example, in some aspects, in addition to other forms, communications subsystem 1260 may receive input communications in the form of structured and/or unstructured data feeds 1265, event streams 1270, event updates 1275, and the like. For example, communications subsystem 1260 may be configured to receive (or send) data feeds 1265 in real-time from users of social media networks and/or other communication services, such as Twitter® feeds, Facebook® updates, web feeds, such as Rich Site Summary (RSS) feeds, and/or real-time updates from one or more third party information sources.

In certain aspects, communications subsystem 1260 may be configured to receive data in the form of continuous data streams, which may include event streams 1270 of real-time events and/or event updates 1275, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1260 may also be configured to communicate data from computer system 1200 to other computer systems or networks. The data may be communicated in various forms, such as structured and/or unstructured data feeds 1265, event streams 1270, event updates 1275, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in art can appreciate other ways and/or methods to implement the various aspects.

FIG. 13 illustrates an example process flow 1300 for deploying model weights securely from a GenAI platform to a cloud service. The blocks in flowchart are illustrated in a specific order, while the order can be modified, for example, some blocks may be performed before other, and some blocks may be performed simultaneously. The block can be performed by hardware or software or a combination thereof. The process 1300 may include accessing the model metadata and a set of weights of a generative machine-learning model associated with a generative machine-learning platform hosted on a cloud, at block 1305. These model weights may be encrypted using a first encryption key, also referred to as data encryption key (DEK), that may be provided in the model metadata. The encrypted set of weights may be stored in a cloud storage (e.g., GenAI platform object/model store 540) within the cloud that is dedicated to the generative machine-learning platform, also termed as GenAI platform cloud tenancy. The encrypted weights can be managed by GenAI vault 535 within the GenAI platform cloud tenancy 530. Each key may be associated with the specific type of the generative machine-learning models. These encrypted model weights may be decrypted based on the model metadata by utilizing the first encryption key from the model metadata, at block 1310. Each key may be associated with the specific type of model weights. At block 1315, a second encryption key may be generated within a GenAI cloud home region. Before storing the model weights from the GenAI platform cloud tenancy to a cloud storage in GenAI cloud home region, at block 1325, the model weights may be encrypted again by utilizing a second encryption key, at block 1320. The second encryption key, also termed as key encryption key (KEK), for GenAI model weights may be managed independently by the GenAI cloud vault or key management service (KMS) within the GenAI home region.

When deploying model weights for inference tasks, access to the cloud storage holding the securely encrypted weights can be enabled. This may involve setting up access credentials or authentication mechanisms to securely retrieve the encrypted weights as required. Furthermore, the deployment environment may be structured into namespaces, offering logical isolation and resource management within the cloud computing environment. Within these designated namespaces, a deployment process can be devised to oversee the deployment of the model weights and related components. The process may define the steps for accessing, loading, and utilizing the weights to execute inference tasks. Once the deployment process is finalized, the encrypted model weights may be deployed within a specified namespace, at block 1330. The deployment process may involve organizing and formatting the weights appropriately for deployment, along with metadata and/or configurations. In some instances, each deployment is linked to a specific service account from among the available service accounts.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation, such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

accessing a model metadata and a set of weights of a generative machine-learning model encrypted using a first encryption key that is generated by a generative machine-learning platform, wherein the generative machine-learning model is associated with the generative machine-learning platform hosted on a cloud, and wherein the model metadata includes the first encryption key;

utilizing the first encryption key from the model metadata to decrypt, based on the model metadata, the set of weights of the generative machine-learning model;

generating a second encryption key within a cloud home region;

encrypting, based on the model metadata, the set of weights by the second encryption key;

storing the encrypted set of weights to a cloud storage in the cloud home region;

accessing the encrypted set of weights from the cloud storage;

decrypting the encrypted set of weights using the second encryption key;

loading the set of weights from the cloud storage to a temporary storage;

receiving an inference query associated with the generative machine-learning model into the temporary storage;

performing an inference task by applying the set of weights to the inference query;

generating an inference output in response to performing the inference task; and deleting the set of weights from the temporary storage.

2. The computer-implemented method of claim 1, wherein the model metadata is stored in a generative machine-learning platform cloud tenancy.

3. The computer-implemented method of claim 1, wherein the first encryption key is associated with a single set of model weights of the generative machine-learning model.

4. The computer-implemented method of claim 1, wherein the first and second encryption keys are associated with a specific type of the generative machine-learning models.

5. The computer-implemented method of claim 1, further comprising:

deploying the encrypted set of weights of the generative machine-learning model in a namespace within the cloud home region, wherein each deployment is associated with a single service account.

6. The computer-implemented method of claim 1, wherein the second encryption key is accessed by a single service account.

7. The computer-implemented method of claim 1, further comprising:

rotating encryption keys after a predefined interval of time by generating a new second encryption key;

decrypting the first encryption key with the second encryption key;

encrypting the first encryption key using the new second encryption key; and storing the first encryption key and the new second encryption key in a cloud identity module.

8. A system comprising:

one or more data processors; and a non-transitory computer readable storage medium containing instructions which, when executed on the one or more data processors, cause the one or more data processors to perform actions including:

accessing a model metadata and a set of weights of a generative machine-learning model encrypted using a first encryption key that is generated by a generative machine-learning platform, wherein the generative machine-learning model is associated with the generative machine-learning platform hosted on a cloud, and wherein the model metadata includes the first encryption key;

utilizing the first encryption key from the model metadata to decrypt, based on the model metadata, the set of weights of the generative machine-learning model;

generating a second encryption key within a cloud home region;

encrypting, based on the model metadata, the set of weights by the second encryption key;

storing the encrypted set of weights to a cloud storage in the cloud home region;

accessing the encrypted set of weights from the cloud storage;

decrypting the encrypted set of weights using the second encryption key;

loading the set of weights from the cloud storage to a temporary storage;

receiving an inference query associated with the generative machine-learning model into the temporary storage;

performing an inference task by applying the set of weights to the inference query;

generating an inference output in response to performing the inference task; and deleting the set of weights from the temporary storage.

9. The system of claim 8, wherein the model metadata is stored in a generative machine-learning platform cloud tenancy.

10. The system of claim 8, wherein the first encryption key is associated with a single set of model weights of the generative machine-learning model.

11. The system of claim 8, wherein the first and second encryption keys are associated with a specific type of the generative machine-learning models.

12. The system of claim 8, wherein the actions further include:

deploying the encrypted set of weights of the generative machine-learning model in a namespace within the cloud home region, wherein each deployment is associated with a single service account.

13. The system of claim 8, wherein the second encryption key is accessed by a single service account.

14. A computer-program product tangibly embodied in a non-transitory machine-readable storage medium, including instructions configured to cause one or more data processors to perform actions including:

accessing a model metadata and a set of weights of a generative machine-learning model encrypted using a first encryption key that is generated by a generative machine-learning platform, wherein the generative machine-learning model is associated with the generative machine-learning platform hosted on a cloud, and wherein the model metadata includes the first encryption key;

utilizing the first encryption key from the model metadata to decrypt, based on the model metadata, the set of weights of the generative machine-learning model;
generating a second encryption key within a cloud home region;
encrypting, based on the model metadata, the set of weights by the second encryption key;
storing the encrypted set of weights to a cloud storage in the cloud home region;
accessing the encrypted set of weights from the cloud storage;
decrypting the encrypted set of weights using the second encryption key;
loading the set of weights from the cloud storage to a temporary storage;
receiving an inference query associated with the generative machine-learning model into the temporary storage;
performing an inference task by applying the set of weights to the inference query;
generating an inference output in response to performing the inference task; and
deleting the set of weights from the temporary storage.

15. The computer-program product of claim 14, wherein the model metadata is stored in a generative machine-learning platform cloud tenancy.

16. The computer-program product of claim 14, wherein the first and second encryption keys are associated with a specific type of the generative machine-learning models.

17. The computer-program product of claim 14, wherein the actions further include:
deploying the encrypted set of weights of the generative machine-learning model in a namespace within the cloud home region, wherein each deployment is associated with a single service account.

18. The computer-program product of claim 14, wherein the first encryption key is associated with a single set of model weights of the generative machine-learning model.

19. The computer-program product of claim 14, wherein the second encryption key is accessed by a single service account.

20. The computer-program product of claim 14, wherein the actions further include:
rotating encryption keys after a predefined interval of time by generating a new second encryption key;
decrypting the first encryption key with the second encryption key;
encrypting the first encryption key using the new second encryption key; and
storing the first encryption key and the new second encryption key in a cloud identity module.

* * * * *